US012241286B2

(12) United States Patent
Fan

(10) Patent No.: US 12,241,286 B2
(45) Date of Patent: Mar. 4, 2025

(54) PADLOCK BASIC ASSEMBLY KIT AND PADLOCK SYSTEM

(71) Applicant: ABUS August Bremicker Söhne KG, Wetter-Volmarstein (DE)

(72) Inventor: Wai Kuen Fan, Kowloon (HK)

(73) Assignee: ABUS August Bremicker Sohne KG, Wetter-Volmarstein (DE)

( * ) Notice: Subject to any disclaimer, the term of this patent is extended or adjusted under 35 U.S.C. 154(b) by 102 days.

(21) Appl. No.: 18/030,493

(22) PCT Filed: Sep. 30, 2021

(86) PCT No.: PCT/EP2021/077017
§ 371 (c)(1),
(2) Date: Apr. 5, 2023

(87) PCT Pub. No.: WO2022/073854
PCT Pub. Date: Apr. 14, 2022

(65) Prior Publication Data

US 2023/0366242 A1 Nov. 16, 2023

(30) Foreign Application Priority Data

Oct. 6, 2020 (DE) ......................... 102020126124.1

(51) Int. Cl.
*E05B 67/02* (2006.01)
*E05B 63/00* (2006.01)
(Continued)

(52) U.S. Cl.
CPC .......... *E05B 67/02* (2013.01); *E05B 63/0056* (2013.01); *E05B 67/063* (2013.01); *E05B 67/24* (2013.01)

(58) Field of Classification Search
CPC ........ E05B 67/00; E05B 67/02; E05B 67/063; E05B 67/24; E05B 63/0056; E05B 9/08
(Continued)

(56) References Cited

U.S. PATENT DOCUMENTS 4,290,279 A * 9/1981 Fish ........................ E05B 67/24 70/52
4,545,223 A 10/1985 Poutiainen et al.
(Continued)

FOREIGN PATENT DOCUMENTS

DE 4323693 A1 1/1995
DE 60115864 T2 7/2006
(Continued)

*Primary Examiner* — Suzanne L Barrett
(74) *Attorney, Agent, or Firm* — Dickinson Wright PLLC

(57) ABSTRACT

A padlock basic kit for assembling a padlock in a configuration that can be selected from a plurality of configurations, wherein the configurations differ with respect to the type of lock cylinder used in the padlock and optionally additionally with respect to the type of closing hoop used in the padlock, comprises a lock body, at least two different lock cylinder adapters, and a closing plate. In this respect, a first one of the at least two lock cylinder adapters has a reception passage that is configured to receive a lock cylinder of a first type and a second one of the at least two lock cylinder adapters has a reception passage that is configured to receive a lock cylinder of a second type. The lock body has a lock cylinder receiver that extends along a longitudinal direction into the lock body and that is configured to selectively receive the first lock cylinder adapter with a lock cylinder of the first type inserted therein, the second lock cylinder adapter with a lock cylinder of the second type inserted therein, or a lock cylinder of a third type. The closing plate is configured to close the lock cylinder receiver such that it substantially completely covers a respective lock cylinder received in the lock cylinder receiver.

18 Claims, 8 Drawing Sheets

(51) Int. Cl.
*E05B 67/06* (2006.01)
*E05B 67/24* (2006.01)

(58) Field of Classification Search
USPC .................................................... 70/39, 38 A
See application file for complete search history.

(56) References Cited

U.S. PATENT DOCUMENTS

| | | | | |
|---|---|---|---|---|
| 5,233,851 | A | 8/1993 | Florian | |
| 6,425,274 | B1 | 7/2002 | Laitala et al. | |
| 2007/0240459 | A1 | 10/2007 | Fantl et al. | |
| 2009/0007606 | A1 | 1/2009 | Gunther | |
| 2012/0186308 | A1 * | 7/2012 | Garthe .................... | E05B 67/02 70/20 |
| 2013/0276487 | A1 | 10/2013 | Burmesch et al. | |

FOREIGN PATENT DOCUMENTS

| | | | |
|---|---|---|---|
| DE | 102013222422 | A1 | 5/2015 |
| EP | 2261447 | A2 | 12/2010 |
| EP | 2868850 | A1 | 5/2015 |
| WO | 0165036 | A1 | 9/2001 |
| WO | 2020173986 | A1 | 9/2020 |

* cited by examiner

PADLOCK BASIC ASSEMBLY KIT AND PADLOCK SYSTEM

CROSS-REFERENCE TO RELATED APPLICATIONS

This application is a national stage application of International Application No. PCT/EP2021/077017, filed on Sep. 30, 2021, which claims priority to German Patent Application No. 102020126124.1 filed on Oct. 6, 2020. The entire disclosures of each of the above applications are incorporated herein by reference.

The invention relates to a padlock basic kit for assembling a padlock in a configuration that may be selected from a plurality of configurations. The configurations from which a respective one may be selected in this respect differ with respect to the type of lock cylinder used in the padlock. The basic kit therefore makes it possible that a respective lock cylinder may be selected from lock cylinders of different types and may be used for the assembly of a padlock. Consequently, such a basic kit is suitable both for assembling a padlock with a lock cylinder of a specific type and for assembling a padlock with a lock cylinder of a specific other type. Thus, the basic kit is not limited to a single lock cylinder type, but may be used in a variety of manners since a padlock with a lock cylinder of the respective preferred type may be assembled as required by means of the same basic kit.

Furthermore, the configurations may at least optionally additionally differ with respect to the type of closing hoop used in the padlock in each case. Such a padlock basic kit therefore makes it possible to selectively assemble a padlock with a closing hoop of a specific type or a padlock with a closing hoop of a specific other type. In such a basic kit, the possible configurations therefore differ from one another in pairs either with respect to the type of lock cylinder, or with respect to the type of closing hoop, or with respect to the respective type of both components. In this respect, it is not ruled out that the total possible configurations in which a padlock may be assembled by means of the padlock basic kit also differ with respect to further components that may be available in different types. In this respect, it is a general aim that as compact as possible a padlock may be produced in as many different configurations as possible, in particular with respect to lock cylinders usable in the padlock, by means of the padlock basic kit and in this respect simultaneously exhibits as high a security as possible that, for example, at least satisfies the requirements of class CEN 5 of DIN EN 12320:2012-12.

The invention further relates to a padlock system for the variable formation of padlocks in different configurations that differ with respect to the type of lock cylinder used in the respective padlock. In contrast to the basic kit, such a system in this respect comprises all the basic components to be able to assemble padlocks in the different configurations, that is in particular also lock cylinders of different types. Optionally, the configurations of such a padlock system may additionally differ in a corresponding manner as in the case of the padlock basic kit with respect to the type of closing hoop used in the respective padlock, wherein the system then also comprises closing hoops of different types in contrast to the corresponding basic kit.

Lock cylinders are used in locks of very different types. In this respect, the lock cylinder substantially serves to be rotationally actuated and to transmit this rotation to a latch mechanism of the respective lock, wherein the lock cylinder is configured to only permit a rotational actuation when it takes place by means of a key associated with the lock cylinder. It is thus ensured by the lock cylinder that the lock may only be actuated by means of the key, in particular may only be unlocked by means of the key and, if necessary, may only be locked by means of the key. For different types of locks, different lock cylinders have in this respect been developed that may be adapted in a specific manner to the respective lock and that may therefore, for instance, differ with respect to their shape and dimensions, in particular with respect to their profile, and to the respective mechanism for releasing or blocking a rotary actuation.

For example, so-called profile cylinders are typically used for door locks and their profiles, i.e. the basic cross-section, substantially constant over the total length, transverse to the direction of introduction of the key into the lock cylinder, are standardized. This profile comprises a circular cylinder section, in which the cylinder core is received, and a web section for receiving the tumblers that projects radially from the cylinder section with respect to the center of the cylinder section, whose width (tangential extent) is smaller than the diameter of the cylinder section, and whose length (radial extent) approximately corresponds to the diameter of the cylinder section. However, there are also numerous lock cylinders of another type comprising a large number of different profiles.

In this respect, the basic functional principle of the lock cylinders is, however, usually the same in each case. Therefore, it is generally conceivable to use lock cylinders of different types for a specific lock. This has the advantage that the lock may be variably assembled in different configurations by equipping it with a lock cylinder of a respective type, in particular of a respective profile, depending on the desired configuration. The benefit of assembling a lock in different configurations may, for example, be that a specific lock may thereby be easily offered once with a lock cylinder that offers a normal security against manipulation and another time with a higher-quality lock cylinder that offers a security against manipulation that is improved in comparison thereto. The advantage of being able to use different lock cylinders for the same lock may also be that the one or the other lock cylinder type may be used for assembling the lock in dependence on the availability of different lock cylinders.

In particular padlocks may be used in a wide variety of manners for very different purposes, wherein different lock cylinders may be advantageous depending on the area of application. Therefore, a high degree of variability is in particular desirable for padlocks. In this respect, the variability may not only comprise the padlock being able to be assembled in different configurations, but the variability may advantageously also comprise the padlock being able to be reconfigured relatively easily, that is in particular the lock cylinder installed in the padlock being able be exchanged for a lock cylinder of a different type.

If a basic kit for a padlock is configured such that lock cylinders of different types, in particular of different profiles, may be used for the padlock, the problem results that each of the different lock cylinders has to be able to be substantially equally reliably received and fastened in the padlock despite the different design. The enabling of the different configurations may in particular not result in the padlock offering a downgraded security compared to a conventional padlock in some or even all of the configurations, for instance because there are more access possibilities for manipulations at the lock cylinder due to intermediate spaces or because the lock cylinder may be removed more easily from the padlock due to a less secure fastening.

It is an object of the invention to provide a padlock basic kit as well as a padlock system of the initially mentioned kind that offer a high variability with respect to the configuration of the padlock to be assembled and in this respect nevertheless ensure a reliable and safe assembly of the padlock.

The object is satisfied by a padlock basic kit having the features of claim 1 and by a padlock system having the features of claim 17. Advantageous embodiments result from the dependent claims, from the present description, and from the Figures.

The padlock basic kit in accordance with the invention for assembling a padlock in a configuration that may be selected from a plurality of configurations, wherein the configurations differ with respect to the type of lock cylinder used in the padlock and optionally additionally with respect to the type of closing hoop used in the padlock, comprises a lock body, at least two different lock cylinder adapters, and a closing plate. In this respect, the lock cylinders of different types in particular at least differ with respect to their respective profile, i.e. their cross-section transverse to a key introduction direction in which a key associated with the respective lock cylinder may be introduced into the lock cylinder. In this respect, the cross-section may in particular be at least substantially constant over the total length (extent in the key introduction direction) of the lock cylinder. In any event, no section of the lock cylinder preferably extends beyond the cross-section transversely to the key introduction direction. In this case, the profile therefore corresponds to the outer contour of the lock cylinder with a direction of view in parallel with the key introduction direction.

A first one of the at least two lock cylinder adapters has a reception passage that is configured to receive a lock cylinder of a first type and a second one of the at least two lock cylinder adapters has a reception passage that is configured to receive a lock cylinder of a second type. The padlock basic kit may in this respect comprise even further lock cylinder adapters that each have a reception passage that is configured to receive a lock cylinder of a further type.

The fact that the reception passages are each configured to receive a lock cylinder of a respective type preferably comprises the lock cylinder fitting precisely into the reception passage, in particular such that it contacts the reception passage in an at least substantially fully flush manner after the reception. The reception passages of the lock cylinder adapters may in particular each be formed continuously, that is extend from an outer side of the respective adapter up to an outer side opposite thereto. The reception passages further preferably each at least regionally have a constant cross-section transverse to the direction of their extent into or through the respective adapter.

The lock body furthermore has a lock cylinder receiver that extends along a longitudinal direction into the lock body and that is configured to selectively receive the first lock cylinder adapter with a lock cylinder of the first type inserted therein, i.e. received in the reception passage of the first lock cylinder adapter, or the second lock cylinder adapter with a lock cylinder of the second type inserted therein, i.e. received in the reception passage of the second lock cylinder adapter.

The lock cylinder receiver may, for example, extend into the lock body from an end face of the lock body that corresponds to that side of the padlock to be assembled at which the key is introduced into the respective lock cylinder of the padlock. In this respect, the lock cylinder receiver preferably does not extend through the lock body, but ends within the lock body, wherein it may also lead into another hollow space of the lock body, e.g. a rotating latch receiver for receiving a rotating latch cooperating with the lock cylinder.

The lock cylinder receiver of the lock body is preferably configured to selectively receive the first lock cylinder adapter with a lock cylinder of the first type inserted therein, the second lock cylinder adapter with a lock cylinder of the second type inserted therein, or a lock cylinder of a third type. Unlike on the use of a lock cylinder of the first type or of the second type, the lock cylinder of the third type is in this respect directly received in the lock cylinder receiver of the lock body, that is without being inserted into a lock cylinder adapter that is in turn received in the lock cylinder receiver.

In a manner corresponding to the reception passages, the configuration of the lock cylinder receiver comprises receiving a lock cylinder of the third type, preferably such that the lock cylinder fits precisely into the lock cylinder receiver, in particular such that the lock cylinder contacts the lock cylinder receiver in an at least substantially fully flush manner after the reception.

Said design of the lock cylinder receiver of the lock body relative to the at least two lock cylinder adapters for lock cylinders of the first type or the second type and, if applicable, to the lock cylinder of the third type makes it possible that the basic kit is not fixed to a specific type of lock cylinder, but rather that a lock cylinder of the first type or the second type with the respective corresponding lock cylinder adapter or, if applicable, also a lock cylinder of the third type without a lock cylinder adapter may selectively be inserted into the lock cylinder receiver. Thus, by means of the basic kit in accordance with the invention, a padlock may be assembled in at least two, preferably three, different configurations that differ with respect to the lock cylinder type used in the padlock, wherein only two different lock cylinder adapters are necessary for this purpose. The desired configuration may be freely selected in this respect. The type of lock cylinder used for the padlock to be assembled may e.g. be selected in dependence on the level of security desired for the padlock.

In accordance with the invention, provision is further made that the closing plate is configured to close the lock cylinder receiver such that it substantially completely covers a respective lock cylinder received in the lock cylinder receiver (with or without a lock cylinder adapter, depending on its type), in particular apart from a key opening formed in the closing plate for the introduction of a key into the respective lock cylinder.

In this respect, the closing plate may in particular completely cover the lock cylinder received in the lock cylinder receiver in that, with a projection in parallel with said longitudinal direction, the lock cylinder is located completely within an outer contour of the closing plate, and indeed irrespectively of what type of lock cylinder it is.

The closing plate may, for example, consist of a hardened metal. The closing of the lock cylinder receiver preferably takes place by fastening the closing plate in an opening region of the lock cylinder receiver. In this respect, the opening region may in particular directly adjoin said end face from which the lock cylinder receiver extends into the lock body.

Due to the closing of the lock cylinder receiver, the closing plate (which is separate from the lock cylinders and lock cylinder adapters) not only holds the respective lock cylinder, possibly including the corresponding lock cylinder adapter, securely in the lock cylinder receiver, but also prevents access to the lock cylinder from the outside by means of said covering—possibly apart from access to a keyway in a cylinder core of the respective lock cylinder, which access may under certain circumstances be necessary for the introduction of a key. In this way, the padlock produced by means of the basic kit may have a particularly secure and reliable assembly despite the variability with respect to the lock cylinder used.

In accordance with an advantageous embodiment, provision is made that the reception passage of the first lock cylinder adapter extends along an insertion direction into the first lock cylinder adapter and in this respect at least regionally has a constant reception cross-section that is complementary to the profile of a lock cylinder of the first type (such that a lock cylinder of the first type may be inserted into the reception passage of the first lock cylinder adapter in the insertion direction), and that the reception passage of the second lock cylinder adapter extends along an insertion direction into the second lock cylinder adapter and in this respect at least regionally has a constant reception cross-section that is complementary to the profile of a lock cylinder of the second type (such that a lock cylinder of the second type may be inserted into the reception passage of the second lock cylinder in the insertion direction), wherein the lock cylinder receiver of the lock body at least regionally has a constant reception cross-section with respect to the longitudinal direction, and wherein the at least two lock cylinder adapters each have a profile that is complementary to the reception cross-section of the lock cylinder receiver of the lock body (such that selectively one of the at least two lock cylinder adapters with a lock cylinder of the first type or second type inserted therein may be inserted into the lock cylinder receiver, in particular with the insertion direction aligned in parallel with the longitudinal direction of the lock body).

If the lock cylinder receiver of the lock body is configured to selectively receive the first lock cylinder adapter with a lock cylinder of the first type, the lock cylinder adapter with a lock cylinder of the second type, or a third lock cylinder adapter, the reception cross-section of the lock cylinder receiver of the lock body is preferably complementary to the profile of a lock cylinder of the third type. In this case, the profiles of the two lock cylinder adapters correspond to the profile of a lock cylinder of the third type.

Said reception cross-sections in each case limit the maximum cross-section which an object may have that is received in the insertion direction or the longitudinal direction into the reception passage of the respective lock cylinder adapter or into the lock cylinder receiver of the lock body. The reception cross-sections of the reception passages of the lock cylinder adapters in this respect each relate to the insertion direction of the respective adapter, while the reception cross-section of the lock cylinder receiver of the lock body relates to the longitudinal direction.

The reception cross-sections of the reception passages of the lock cylinder adapters and the reception cross-section of the lock cylinder receiver of the lock body do not necessarily have to be constant throughout, but may in particular only be at least regionally constant in that the cross-section in other regions may be expanded with respect thereto, for example, to form an undercut. In addition, hollow spaces formed deeper in the lock body and adjoining the lock cylinder receiver may also have narrower cross-sections, wherein such regions may, however, be left out of consideration since they do not serve to receive a lock cylinder or a lock cylinder adapter and are therefore not part of the lock cylinder receiver.

Said profiles of the lock cylinders or lock cylinder adapters each correspond to an outer cross-section of the respective lock cylinder, in particular of a cylinder housing of the respective lock cylinder, or to an outer cross-section of the respective lock cylinder adapter transverse to the direction in which a key may be introduced into the lock cylinder or a lock cylinder may be inserted into the lock cylinder adapter. All the lock cylinders of the same type may in particular each have the same profile, while lock cylinders of different types have different profiles from one another.

As a result of said respective complementary design of a respective reception cross-section to a respective profile, the profile and the reception cross-section contact one another in a flush manner in the inserted state, whereby a secure and stable seat of the respective lock cylinder or of the respective lock cylinder adapter in the respective lock cylinder adapter or the lock body is achieved. Specific tolerances may in this respect be provided, e.g. a clearance fit by which the insertion or replacement is facilitated. Alternatively, a transition fit may also be provided for a tighter fit. If a simple interchangeability is not the aim, an interference fit may at least in principle also be considered.

In accordance with an advantageous embodiment, lock cylinders of a respective type, in particular, for example, of said first type, have a profile that comprises a circular cylinder section and a web section that projects radially from the cylinder section with respect to the center of the cylinder section, that is preferably rounded at its free end, whose width (tangential extent) is smaller than the diameter of the circular shape of the cylinder section, and whose length (radial extent) at least substantially, preferably except for at most one millimeter, corresponds to the diameter of the cylinder section. All the lock cylinders of this type preferably have the same profile. Lock cylinders of this type may in particular be so-called profile cylinders, e.g. in accordance with the standard DIN EN 1303/2005. Accordingly, the diameter of the circular shape of the cylinder section may, for example, amount to 17 mm, the width of the web section may, for example, amount to 10 mm, and the length of the web section may, for example, amount to 16.3 mm such that the profile has a total extent of, for example, 33.3 mm along the direction in which the web section extends.

In accordance with an advantageous embodiment, lock cylinders of a respective type, in particular, for example, of said second type, have a profile that comprises a circular cylinder section and a tumbler section having a circular contour offset with respect to the cylinder section such that the cylinder section and the tumbler section together form the shape of two circular surfaces that are offset from one another and that partly overlap one another. In this respect, provision may in particular be made that the two circular surfaces at least substantially have the same diameter, i.e. except for a few millimeters, preferably one millimeter. In addition, the offset between the circular surfaces may in particular amount to less than the diameter of the circular surfaces (in the case of different diameters: of the larger circular surface) such that the profile at least substantially has the shape of an eight. All the lock cylinders of this type preferably have the same profile.

In accordance with an advantageous embodiment, lock cylinders of a respective type, in particular, for example, of said third type, have a profile whose shape corresponds to the convex envelope of two mutually offset circular surfaces that preferably at least substantially have the same diameter, i.e. except for a few millimeters, preferably one millimeter. All the lock cylinders of this type preferably have the same profile. The lock cylinders of this type may in particular be so-called oval cylinders, e.g. in accordance with the standard DIN EN 1303/2005.

Accordingly, the diameter of both circular surfaces may each, for example, amount to 20 mm and the offset of the two circular surfaces from one another may, for example, amount to 15 mm such that the profile has a total extent of, for example, 35 mm along the direction of the offset.

Furthermore, it is preferred if the profiles of at least two lock cylinder types are formed in the respective manner mentioned above. It is particularly preferred if the lock cylinder receiver of the lock body is configured to selectively receive a lock cylinder of a first type, a lock cylinder of a second type, or a lock cylinder of a third type by means of a respective lock cylinder adapter or directly (i.e. without a lock cylinder adapter), the profiles of all three lock cylinder types being formed in a respective one of the aforementioned manners.

In accordance with an advantageous embodiment, the basic kit comprises at least two different rotating latches that are each configured to be rotatably supported in the lock body about an axis of rotation in parallel with the longitudinal direction in order, depending on the rotational position, to lock a closing hoop displaceably supported at the lock body against departing from a closed position, wherein a first one of the at least two rotating latches is configured to be rotationally effectively coupled to an entrainer section of a lock cylinder of at least one of said types, and a second one of the at least two rotating latches is configured to be rotationally effectively coupled to an entrainer section of a lock cylinder of at least one other of said types. At least one of the two rotating latches is preferably configured to be rotationally effectively couplable to the respective entrainer section of two lock cylinder types.

In such an embodiment, depending on the lock cylinder used, a rotating latch suitable for a rotationally effective coupling to its entrainer section may be selected from the different rotating latches and may be used for assembling the padlock. In this respect, the rotating latch may in particular be rotatably supported in the lock body such that its axis of rotation is coaxial to the axis of rotation of a cylinder core of the respective lock cylinder received in the lock body (with or without lock cylinder adapter, depending on the type).

The entrainer sections of the lock cylinders may, for example, each be a structure that projects axially from the cylinder core with respect to an axis of rotation of a cylinder core of the respective lock cylinder, which may in particular be aligned in parallel with said longitudinal direction, and that may be brought into coupling engagement with a structure formed complementarily thereto at an axial end face of the respective rotating latch. If a rotating latch is configured in such a manner, it may simply axially adjoin the lock cylinder for the rotationally effective coupling. For example, one of said structures may be formed as a web, while the other may then be formed as a groove.

However, the entrainer sections may each also be designed as a structure projecting radially with respect to the axis of rotation of the cylinder core of the respective lock cylinder, e.g. in the manner of a so-called closing nose of a profile cylinder. In such a design, it is expedient if the rotating latch at least partly engages around an end section of the respective lock cylinder or of the respective lock cylinder adapter with the respective lock cylinder inserted therein in the direction of revolution about the axis of rotation. The rotating latch may in this regard be configured to be plugged onto said end section, in particular in a radial direction.

The entrainer section to which the first rotating latch may be rotationally effectively coupled and the entrainer section to which the second rotating latch may be rotationally effectively coupled may in particular differ.

Accordingly, provision is made in accordance with an advantageous embodiment that the first rotating latch is configured to be rotationally effectively coupled to an entrainer section of a lock cylinder of at least one of said types that is formed by a structure projecting radially from the cylinder core with respect to an axis of rotation of a cylinder core of the respective lock cylinder and the second rotating latch is configured to be rotationally effectively coupled to an entrainer section of a lock cylinder of at least one other of said types that is formed by a structure projecting axially from the cylinder core with respect to an axis of rotation of a cylinder core of the respective lock cylinder.

For said locking of the respective closing hoop by means of a respective one of the rotating latches, the rotating latches do not necessarily have to be configured to cooperate directly with the closing hoop. Provision may rather be made that the locking takes place indirectly, e.g. via one or more latch elements movably supported in the lock body radially to the axis of rotation of the rotating latch.

In accordance with an advantageous embodiment, provision is made that the basic kit comprises two latch elements, in particular in the form of locking balls, that are arranged diametrically with respect to the axis of rotation and that are supported in a radially movable manner, and that the rotating latches each have a cam section that at least substantially has a cylindrical shape at whose outer periphery two recesses are formed that are diametrically opposed with respect to the axis of rotation, whereby a control contour for the latch elements is formed that, depending on the rotational position of the rotating latch, forces the latch elements into a locked position in which they lock the closing hoop against departing from the closed position or release said closing hoop for a radial movement. In this respect, the rotating latches may each in particular be configured in the manner of a so-called ball slider.

In accordance with a further advantageous embodiment, the closing plate has a key opening for the introduction of a key through the key opening into the respective lock cylinder inserted into the lock cylinder receiver of the lock body, wherein the key opening at least substantially has the shape of two circular sectors that are arranged opposite one another and that have an identical central angle. The central angles may, for example, have a value between 45° and 90°, preferably between 55° and 70°, in particular of approximately 65°. In this respect, the centers of the circular sectors do not necessarily have to lie above one another. The circular sectors may rather overlap one another with their tips by an amount that substantially corresponds to the thickness of the respective key. A kind of butterfly shape is thereby produced.

Said design of the key opening enables both the introduction of the key and a turning of the introduced key about an angle that is limited by said central angle. The central angle is therefore advantageously selected such that it corresponds to the angle of a rotation of the cylinder core required for an actuation of the lock cylinder. In this respect, the key opening is preferably minimal, i.e. it is only as large as is absolutely necessary for the introduction and turning of the key. In this way, the respective lock cylinder inserted into the lock body is covered to the maximum by the closing plate and is secured against unauthorized access from the outside.

To fasten the closing plate to the lock body such that the closing plate may securely close the lock cylinder receiver, an undercut may be formed in the lock cylinder receiver, in particular in said opening region of the lock cylinder receiver, into which undercut the closing plate may engage with a projection. The insertion of the closing plate for closing the lock cylinder receiver may then comprise bringing the projection of the closing plate into engagement with the undercut obliquely to the longitudinal direction and then pivoting the closing plate about a pivot axis, which is defined by this engagement, into a position in which the closing plate closes the lock cylinder receiver perpendicular to the longitudinal direction. In order to be reliably secured in this closing position, the closing plate may subsequently, in particular at its side opposite said projection, be lockable to the lock body.

In accordance with a further advantageous embodiment, provision is made that the lock body has a screw channel for a screw by means of which the closing plate may be locked when it closes the lock cylinder receiver, wherein the screw channel extends transversely to the longitudinal direction into the lock body, and that the lock body further has a blocking passage for a blocking element that leads into the screw channel in parallel with the longitudinal direction in order to block access from the outside through the screw channel to the screw by means of the blocking element inserted into the blocking passage and engaging into the screw channel. In this respect, the screw channel and the blocking passage each preferably have a straight course.

The screw channel may in particular extend into the lock body from the outside and lead into the lock cylinder receiver so that the screw may be screwed into the screw channel from the outside and may be screwed against or into the closing plate inserted into an opening region of the lock cylinder receiver in order to lock said closing plate. The screw may, for example, be a so-called grub screw, i.e. a threaded pin. Provision may generally be made that the screw for locking the closing plate is merely screwed tightly against a side surface of the closing plate such that the closing plate is locked in a clamping manner by the screw.

However, the closing plate preferably has a recess or an undercut into which the screw engages in the screwed-in state to lock the closing plate. The recess may in this respect also be configured as a threaded bore into which the screw may be screwed for particularly fixed locking. When the closing plate has said projection for engaging into an undercut of the lock cylinder receiver, the closing plate preferably cooperates with the screw at its side disposed opposite this projection. Said recess may in particular be formed at the side of the closing plate opposite the projection.

To prevent the locking of the closing plate from being cancelled simply by unscrewing the screw, access to the screw from the outside through the screw channel is expediently blocked by means of the blocking element by inserting the blocking element into the blocking passage. Since the blocking passage leads into the screw channel, which may also include an intersecting of the screw channel, the blocking element may in this respect be used such that it engages into the screw channel, that is extends at least up to and into the screw channel or also through the screw channel, such that it is not possible to remove the screw from the screw channel past the blocking element. The blocking element is in this respect, for example, configured as a preferably at least substantially cylindrical blocking pin or blocking bolt. However, the blocking element may also be configured as a small plate. The blocking passage advantageously has a cross-section complementary to the cross-section of the blocking element.

In accordance with an advantageous further development of such an embodiment, the lock body is configured such that the blocking element may only be removed from the blocking passage via a closing hoop receiver formed in the lock body for receiving a limb of a closing hoop used in the padlock. This has the advantage that access to the screw for unlocking the closing plate may only be permitted by removing the blocking element when the closing hoop receiver is free and the padlock is therefore not closed. In this way, an unlocking of the closing plate requires an opening of the padlock such that the locking of the closing plate is just as secure as the locking of the padlock as a whole.

The blocking passage may in particular extend from the closing hoop receiver up to the screw channel. If the blocking channel extends even further, beyond the screw channel, it preferably still ends within the lock body, that is before it reaches an outer side of the lock body. However, a passage to the outer side of the lock body may in this respect be provided in extension of the blocking passage, said passage having a different cross-section, in particular a (substantially) smaller cross-section, than the blocking passage. Such a passage may serve to introduce a (narrow) tool, e.g. a needle, by means of which the blocking element may be pushed through the passage in the direction of the closing hoop receiver until it has at least left the screw channel.

The different manners presented in which the closing plate may be formed and may close the lock cylinder receiver are also advantageous independently of a padlock basic kit and are part of a separate aspect of the invention that is generally independent of the padlock basic kit. In this respect, the invention also relates to a padlock that comprises a lock body having a lock cylinder receiver for receiving a lock cylinder; and a closing plate that is configured to close the lock cylinder receiver such that it substantially completely covers a respective lock cylinder received in the lock cylinder receiver, wherein an undercut is formed in the lock cylinder receiver, in particular in an opening region of the lock cylinder receiver, and the closing plate is configured to engage with a projection into the undercut and to be locked to the lock body, in particular at a side of the closing plate opposite the projection.

For this purpose, the lock body may have a screw channel for a screw that extends from the outside into the lock body and that leads into the lock cylinder receiver such that the screw may be screwed against the closing plate or into an engagement section of the closing plate, e.g. a recess or an undercut, in order to lock the closing plate when it closes the lock cylinder receiver. In this respect, the lock body may further have a blocking passage for a blocking element that leads into the screw channel so that by inserting the blocking element into the blocking passage such that the blocking element engages into the screw channel, access from the outside through the screw channel to the screw may be at least partly blocked. In this respect, the lock body is preferably configured such that the blocking element may only be removed from the blocking passage via a closing hoop receiver that is formed in the lock body and that is configured to receive a limb of a closing hoop used in the padlock. For example, the blocking passage may extend from the closing hoop receiver up to the screw channel for this purpose.

Furthermore, the closing plate may have a key opening for the introduction of a key through the key opening into the respective lock cylinder inserted into the lock cylinder receiver of the lock body, wherein the key opening at least substantially has the shape of two circular sectors that are arranged opposite one another and that have an identical central angle.

In another respect, the lock body, the closing plate, the screw channel, the screw, the blocking passage, the blocking element, and/or the closing hoop receiver may also each be formed in one or more of the manners described above or below for the respective corresponding element of a padlock basic kit. This in particular relates to the shape, the spatial position, and/or the spatial orientation of the respective element.

In accordance with an advantageous embodiment of the padlock basic kit, the lock body has a first closing hoop receiver and a second closing hoop receiver that extend in parallel with the longitudinal direction into the lock body and that are configured to receive a respective one of two limbs of a closing hoop, wherein the basic kit comprises a reducing element that is configured to be inserted into the first closing hoop receiver in order to reduce its depth, i.e. its extent in the longitudinal direction from the input up to the base of the respective closing hoop receiver. The closing hoop receivers in this respect preferably have identical cross-sections, in particular circular cross-sections.

The closing hoop receivers of a padlock are advantageously adapted to the lengths of the two limbs of a respective closing hoop provided at the padlock. One of the limbs may in particular be longer than the other, whereby it is also possible with a rigid closing hoop that, on an opening of the padlock, only one of the limbs exits from the closing hoop receiver associated with it, while the other limb is merely displaced in the closing hoop receiver associated with it without completely leaving the closing hoop receiver such that the closing hoop does not have to be completely released from the lock body in order to open the padlock.

Different closing hoops may have limbs with a different length difference. Due to the provision of a reducing element as part of the padlock basic kit, the difference of the depths of the two closing hoop receivers may selectively be set (by inserting or omitting the reducing element) to two different values that may correspond to the length differences of two different types of closing hoops. In this way, the variability in the assembly of the padlock made possible by the padlock basic kit is further extended since the configurations in which a respective padlock may be assembled may then also additionally differ with respect to the closing hoop type used.

In accordance with an advantageous embodiment, the depth of the first closing hoop receiver (without a reducing element inserted therein) accordingly differs from the depth of the second closing hoop receiver by an amount that corresponds to the difference of the lengths of the two limbs of a closing hoop of a first type, wherein the reducing element is configured to reduce the depth of the first closing hoop receiver such that the reduced depth of the first closing hoop receiver differs from the depth of the second closing hoop receiver by an amount that corresponds to the difference of the lengths of the two limbs of a closing hoop of a second type.

In accordance with a further advantageous embodiment, the depth of the first closing hoop receiver is greater than the depth of the second closing hoop receiver, wherein the reducing element is configured to reduce the depth of the first closing hoop receiver to the depth of the second closing hoop receiver. Such an embodiment is in particular expedient when closing hoops of a specific type, which is to be usable for the padlock, have limbs of the same length. Furthermore, such an embodiment is also advantageous when, in addition to a closing hoop type that is rigid and that has two limbs of different lengths, flexible closing hoops, for example configured as a cable or a chain, are also to be usable for the padlock.

The padlock system in accordance with the invention for the variable formation of padlocks in different configurations, which differ with respect to the type of lock cylinder used in the respective padlock and optionally additionally with respect to the type of closing hoop used in the respective padlock, comprises at least one padlock basic kit in accordance with any one of the preceding claims as well as at least one lock cylinder of a first type and at least one lock cylinder of a second type.

In this respect, the lock cylinder receiver of the lock body is preferably configured to selectively receive the first lock cylinder adapter with a lock cylinder of the first type inserted therein, the second lock cylinder adapter with a lock cylinder of the second type inserted therein, or a lock cylinder of a third type, and the padlock system further comprises at least one lock cylinder of the third type.

A padlock may then be assembled in a desired configuration, in particular with a lock cylinder of a desired type, by means of such a padlock system by the following steps: selecting a lock cylinder of the desired type; if it is a lock cylinder of the first type, inserting the lock cylinder selected into the reception passage of the first lock cylinder adapter and inserting the first lock cylinder adapter into the lock cylinder receiver of the lock body; if it is a lock cylinder of the second type, inserting the selected lock cylinder into the reception passage of the second lock cylinder adapter and inserting the second lock cylinder adapter into the lock cylinder receiver of the lock body; if lock cylinders of said third type are also provided and it is a lock cylinder of the third type, inserting the selected lock cylinder directly (i.e. without a lock cylinder adapter) into the lock cylinder receiver of the lock body; and closing the lock cylinder receiver by means of the closing plate.

In accordance with an advantageous embodiment, provision is in this respect further made that the padlock basic kit is configured in accordance with one of said embodiments in which the basic kit comprises a reducing element for reducing the depth of a closing hoop receiver and the padlock system further comprises at least one closing hoop of a first type and at least one closing hoop of a second type. In such a padlock system, a closing hoop of the first type or a closing hoop of the second type may therefore selectively be used for the assembly of the padlock such that already four different configurations, preferably six different configurations, in which the padlock may be assembled, result together with the two possible lock cylinder types, preferably three possible lock cylinder types. In this respect, the closing hoops of the first and the second type preferably each have a U shape having two limbs, wherein the limbs of the closing hoop of the first type have different lengths from one another and the limbs of the closing hoop of the second type have the same length.

The padlock system in accordance with the invention preferably comprises all the components that are necessary for the assembly of a padlock in the different configurations. In this respect, not all the components are used in every configuration. The system indeed in particular comprises lock cylinders of different types, of which, however, only one lock cylinder of the respective desired type is used for a respective padlock. In a similar manner, the system may indeed comprise closing hoops of different types of which, however, only one closing hoop of the respective type desired is used for the respective padlock. Depending on the lock cylinder type used, the use of one of the different lock cylinder adapters may then also be necessary. In addition, the rotating latch used may have to be selected from a plurality of different rotating latches in dependence on the lock cylinder type used. And the use of the reducing element may be expedient depending on the closing hoop type used. However, some elements of the padlock system, in particular of the padlock basic kit, are used in each configuration, namely in particular the lock body and the closing plate that ensure a uniform appearance of the padlock despite different configurations.

The invention will be further explained only by way of example in the following with reference to the Figures.

Figure 1:
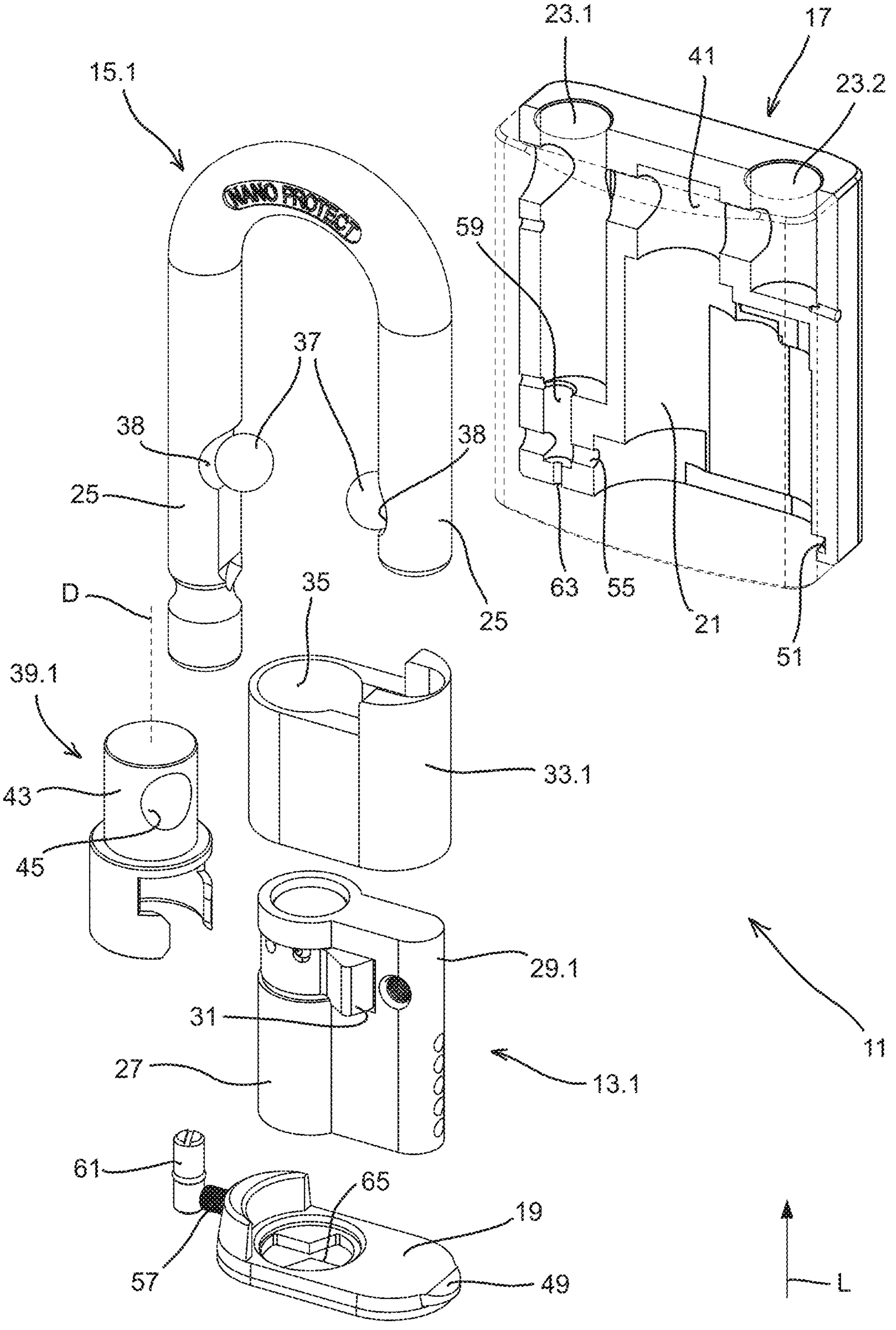
FIG. 1 shows elements of an embodiment of a padlock basic kit in accordance with the invention and of an embodiment of a padlock system in accordance with the invention as an exploded representation of a padlock assembled in a first configuration.
Figure 7:
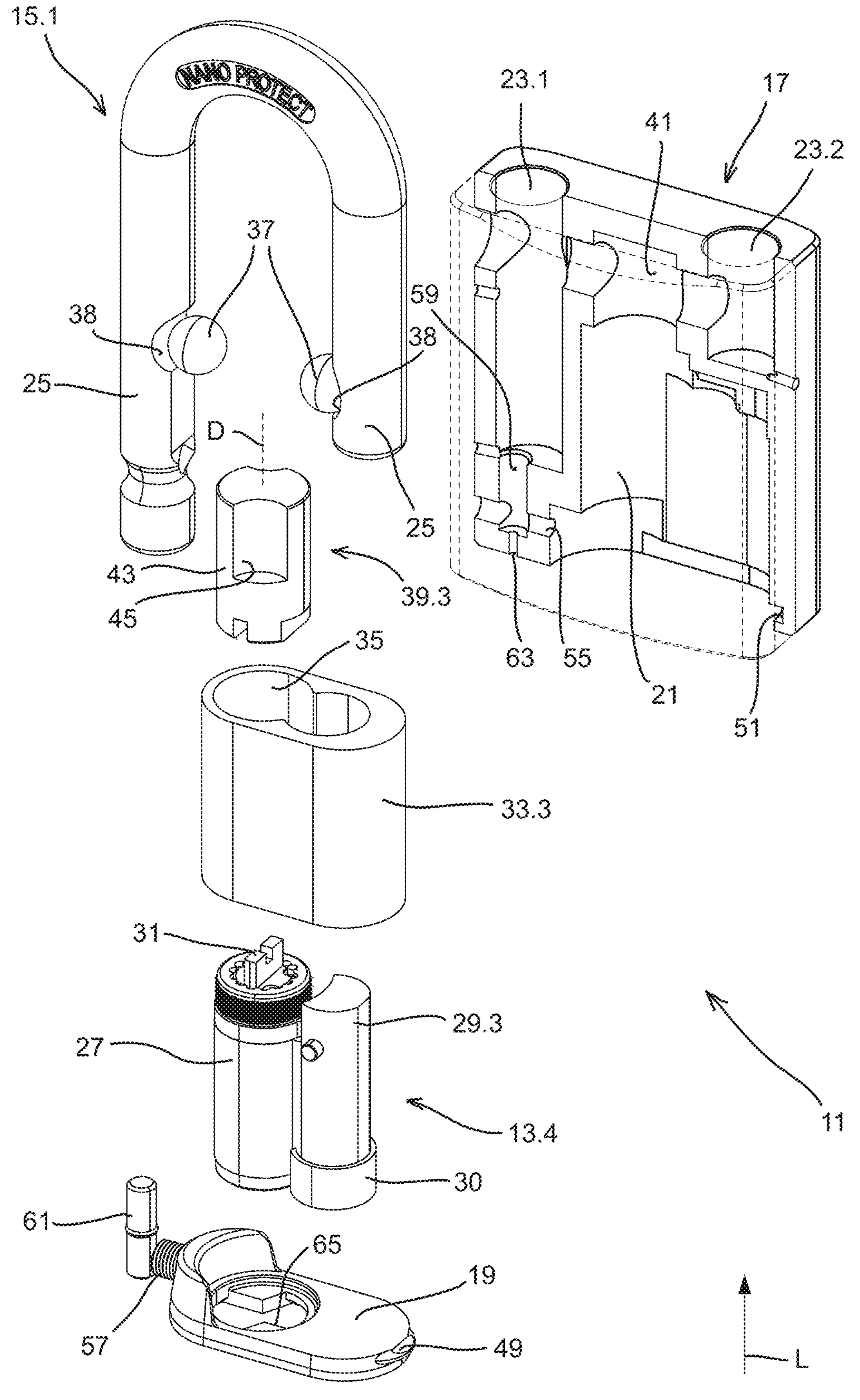
Figure 8B:
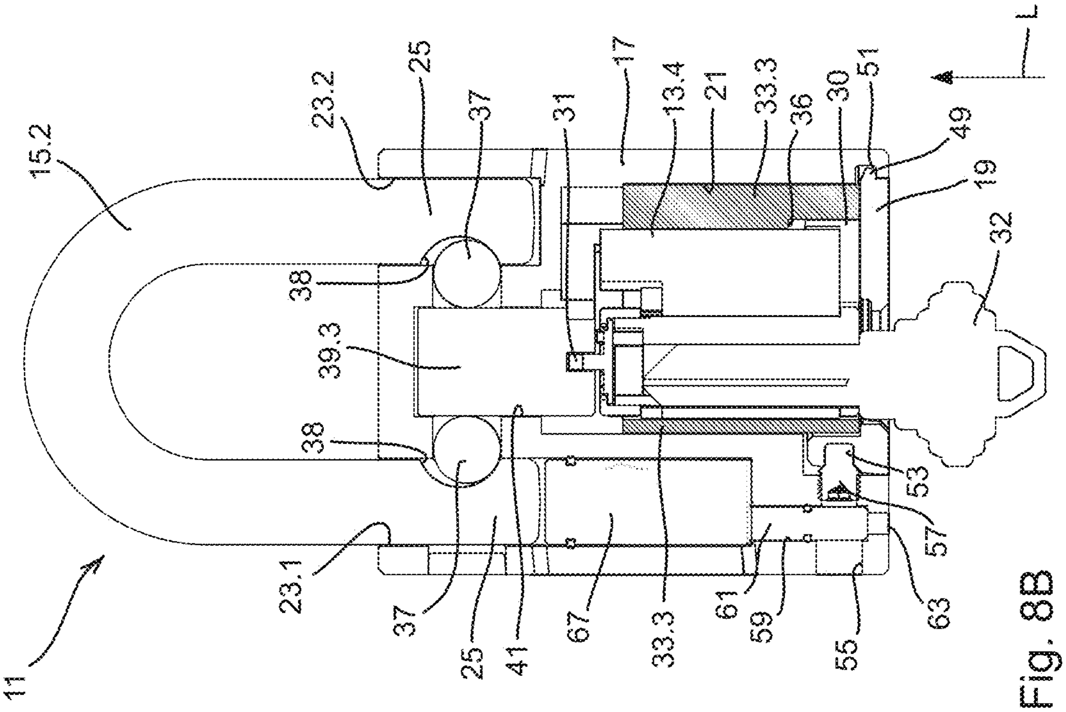
Figure 8A:
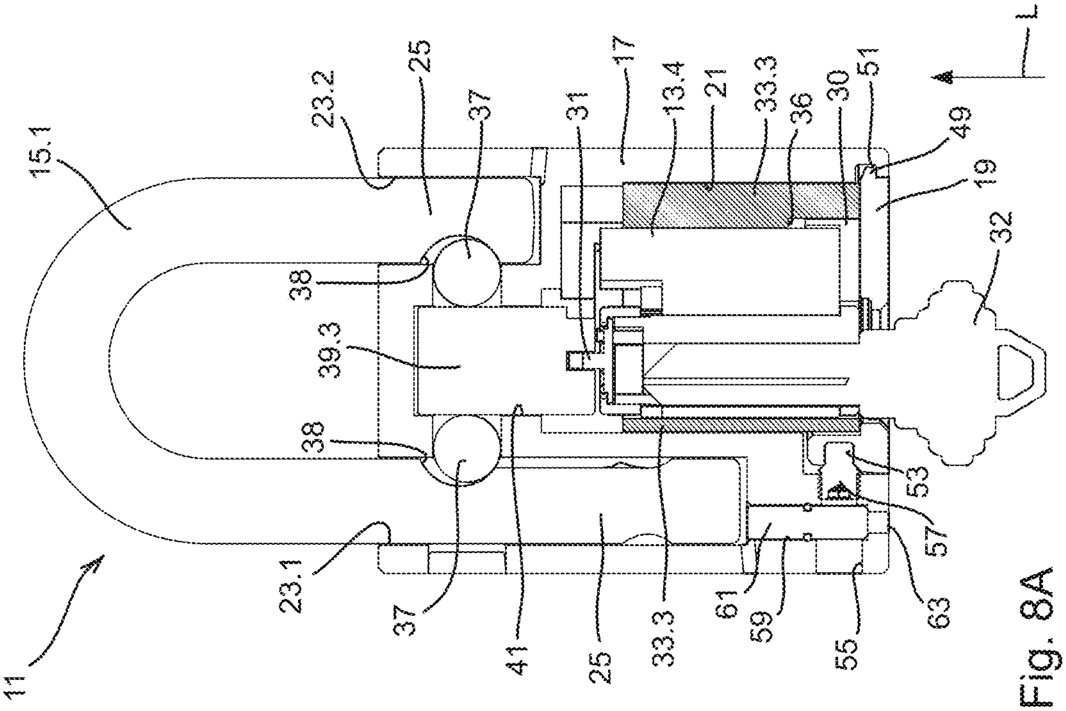

FIG. 7 shows corresponding elements as in FIG. 1 of the embodiment of a padlock basic kit in accordance with the invention or of a padlock system in accordance with the invention as an exploded representation of a padlock assembled in a seventh configuration that differs from the first configuration, from the third configuration, and from the fifth configuration with respect to the type of lock cylinder used;

FIG. 8A shows in a sectional representation the padlock assembled in the seventh configuration shown in FIG. 7; and FIG. 8B shows in a sectional representation a padlock assembled in an eighth configuration, which differs from the seventh configuration with respect to the type of closing hoop used, by means of the same embodiment of a padlock basic kit in accordance with the invention or of a padlock system in accordance with the invention.

The Figures show different padlocks 11 that may be assembled by means of an exemplary embodiment of a padlock basic kit in accordance with the invention as well as lock cylinders 13 of different types and closing hoops 15 of different types or by means of a padlock system in accordance with the invention, and indeed in at least the eight different configurations shown that differ with respect to the type of lock cylinder 13 used in the padlock 11 and the type of closing hoop 15 used in the padlock 11.

Figure 2B:
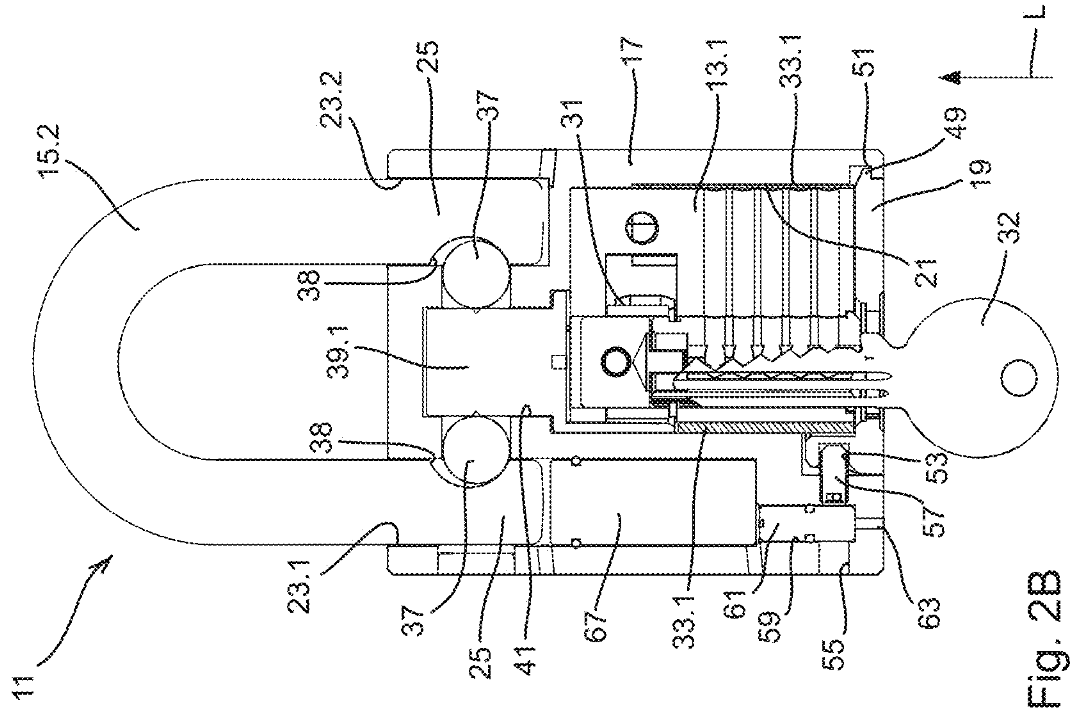
FIG. 2B shows in a sectional representation a padlock assembled in a second configuration, which differs from the first configuration with respect to the type of closing hoop used, by means of the same embodiment of a padlock basic kit in accordance with the invention or of a padlock system in accordance with the invention.
Figure 2A:
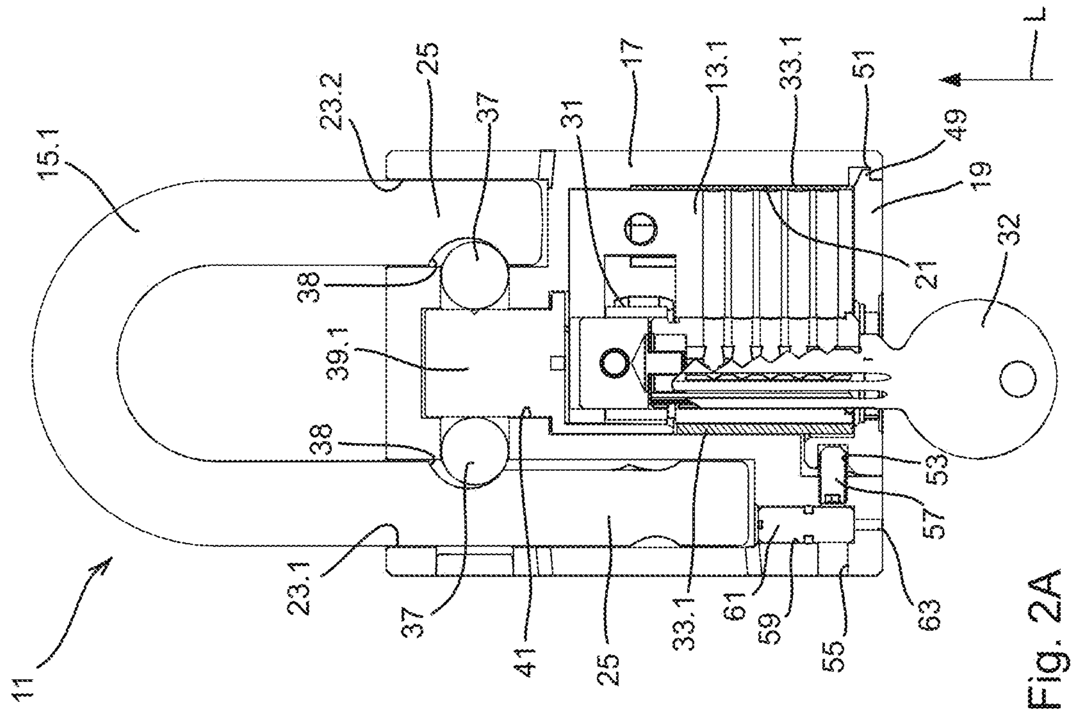
FIG. 2A shows in a sectional representation the padlock assembled in the first configuration shown in FIG. 1.
Figure 3:
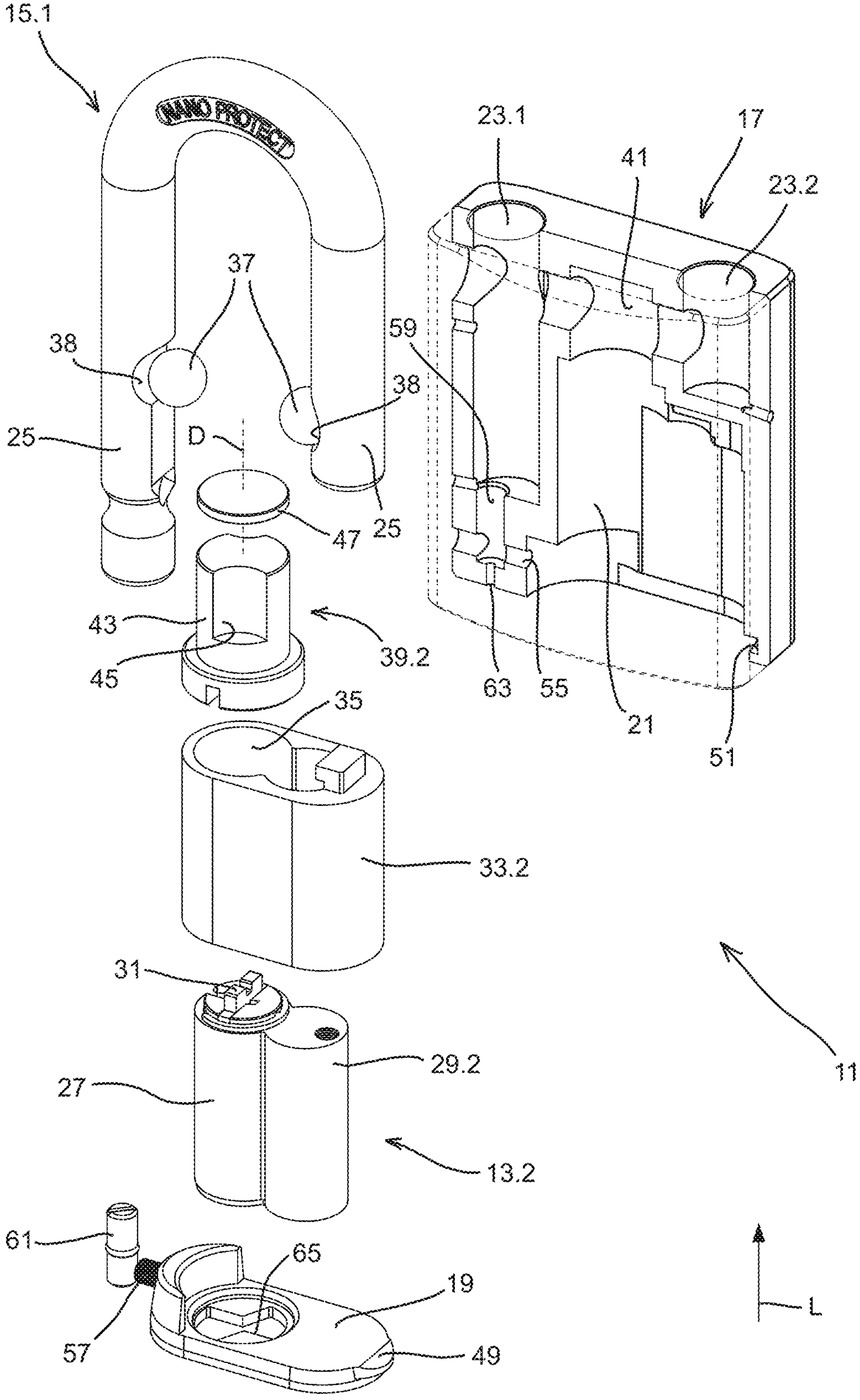
FIG. 3 shows corresponding elements as in FIG. 1 of the embodiment of a padlock basic kit in accordance with the invention or of a padlock system in accordance with the invention as an exploded representation of a padlock assembled in a third configuration that differs from the first configuration with respect to the type of lock cylinder used.
Figure 4B:
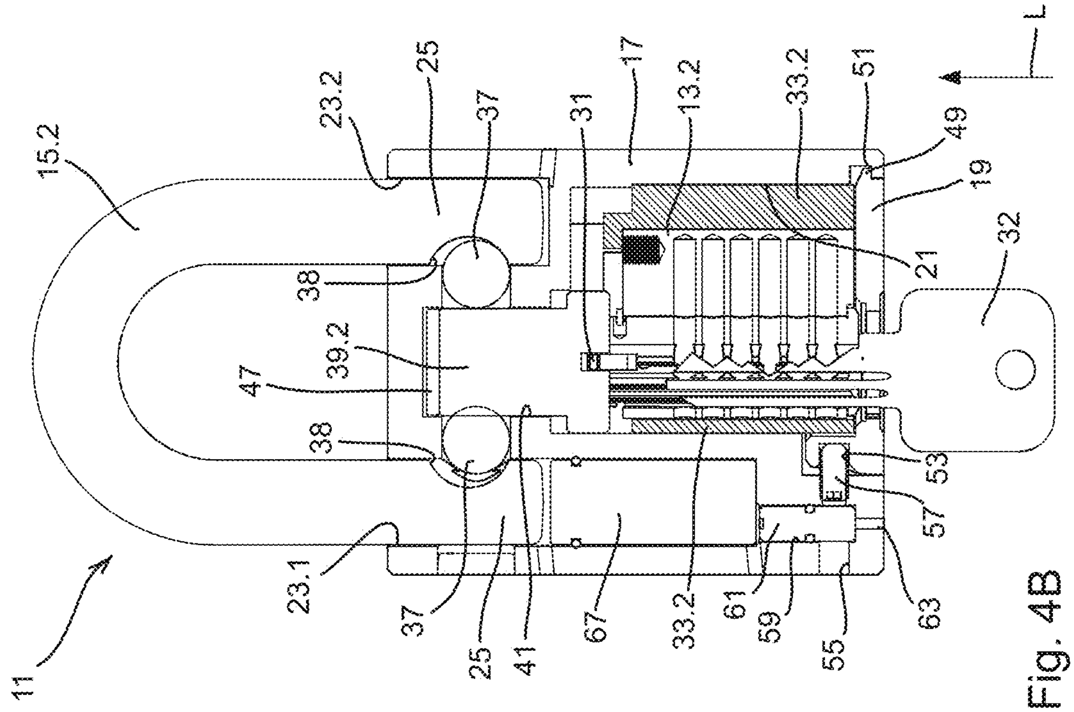
FIG. 4B shows in a sectional representation a padlock assembled in a fourth configuration, which differs from the third configuration with respect to the type of closing hoop used, by means of the same embodiment of a padlock basic kit in accordance with the invention or of a padlock system in accordance with the invention.
Figure 4A:
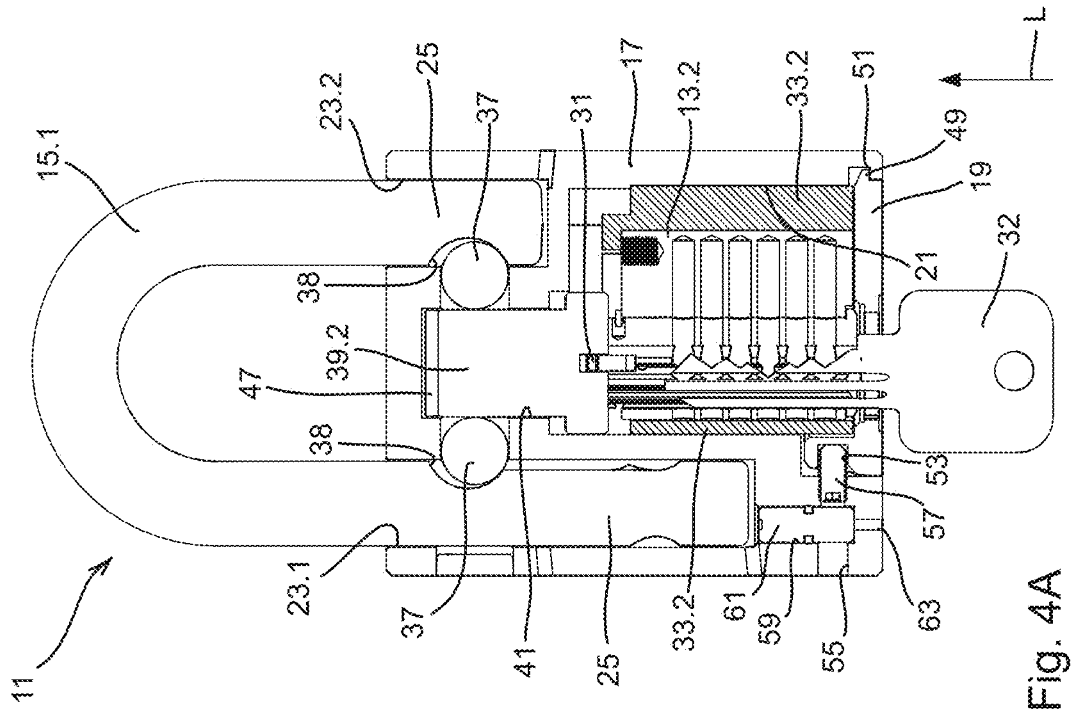
FIG. 4A shows in a sectional representation the padlock assembled in the third configuration shown in FIG. 3.
Figure 5:
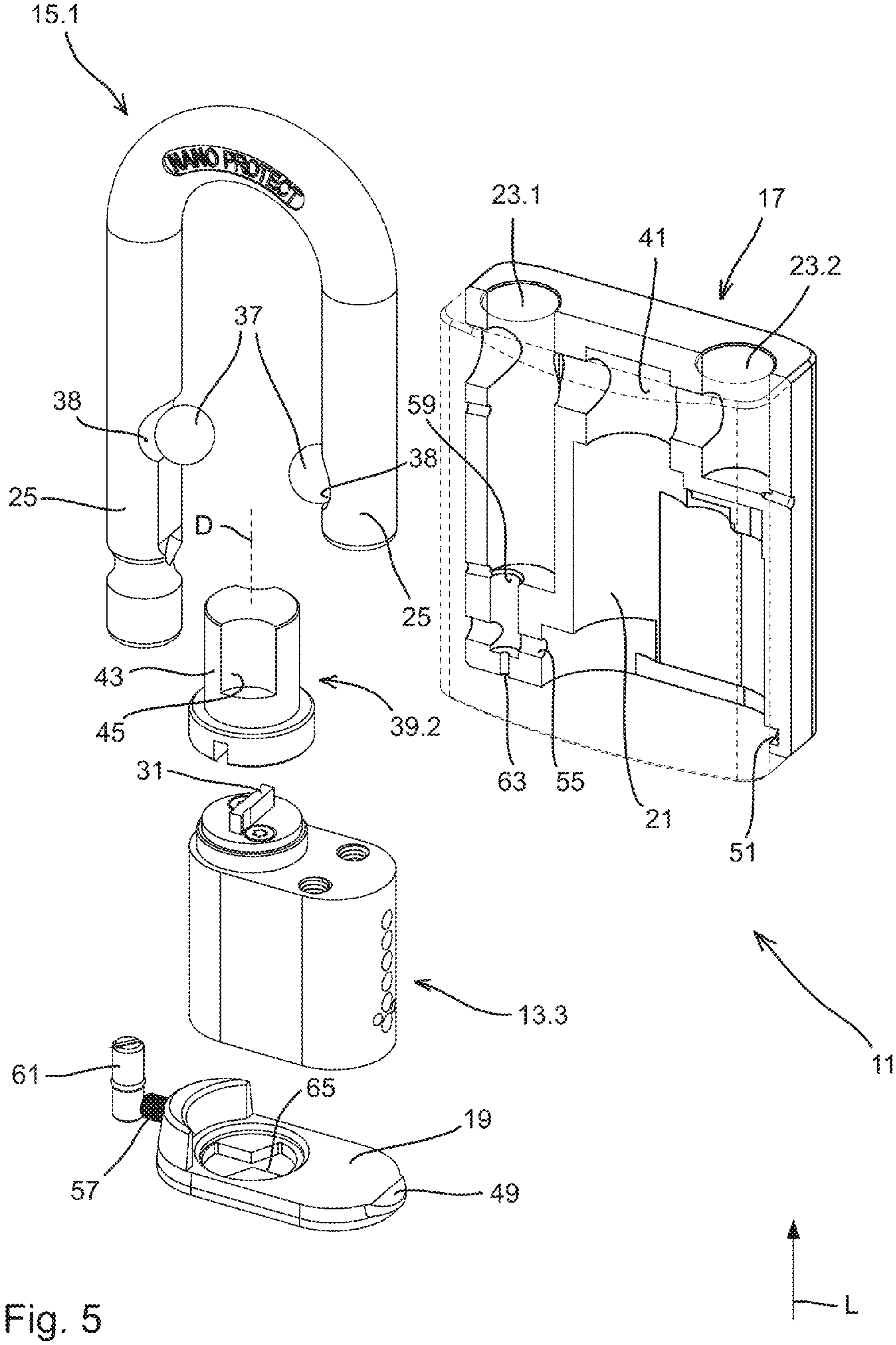
FIG. 5 shows corresponding elements as in FIG. 1 of the embodiment of a padlock basic kit in accordance with the invention or of a padlock system in accordance with the invention as an exploded representation of a padlock assembled in a fifth configuration that differs from the first configuration and from the third configuration with respect to the type of lock cylinder used.
Figure 6B:
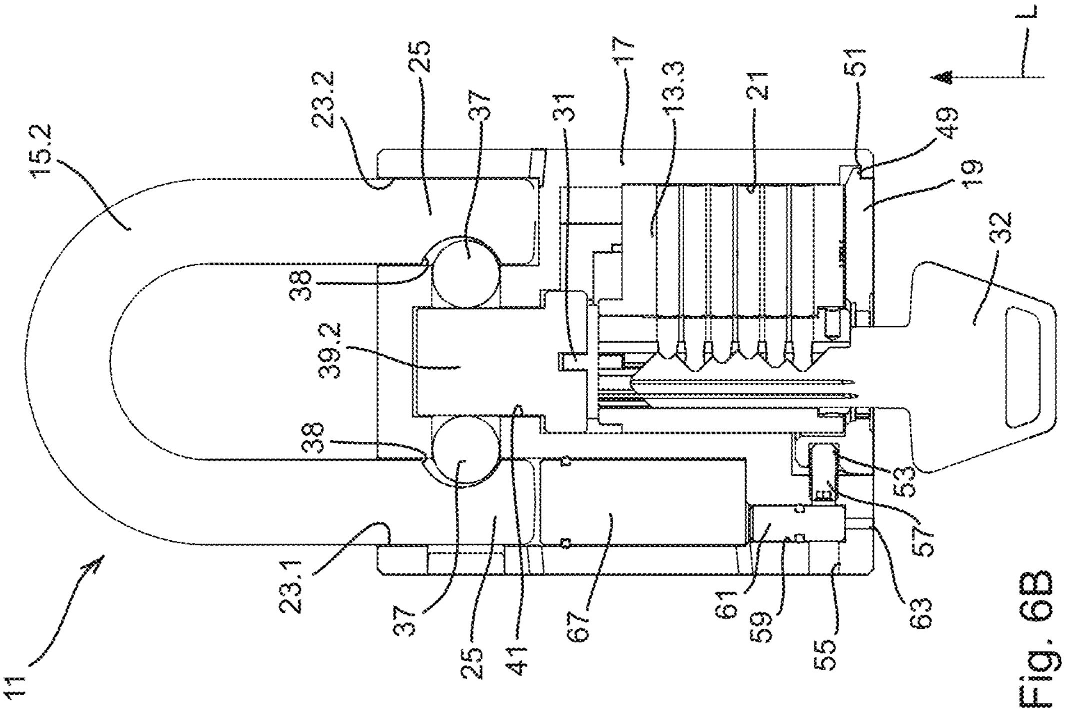
FIG. 6B shows in a sectional representation a padlock assembled in a sixth configuration, which differs from the fifth configuration with respect to the type of closing hoop used, by means of the same embodiment of a padlock basic kit in accordance with the invention or of a padlock system in accordance with the invention.
Figure 6A:
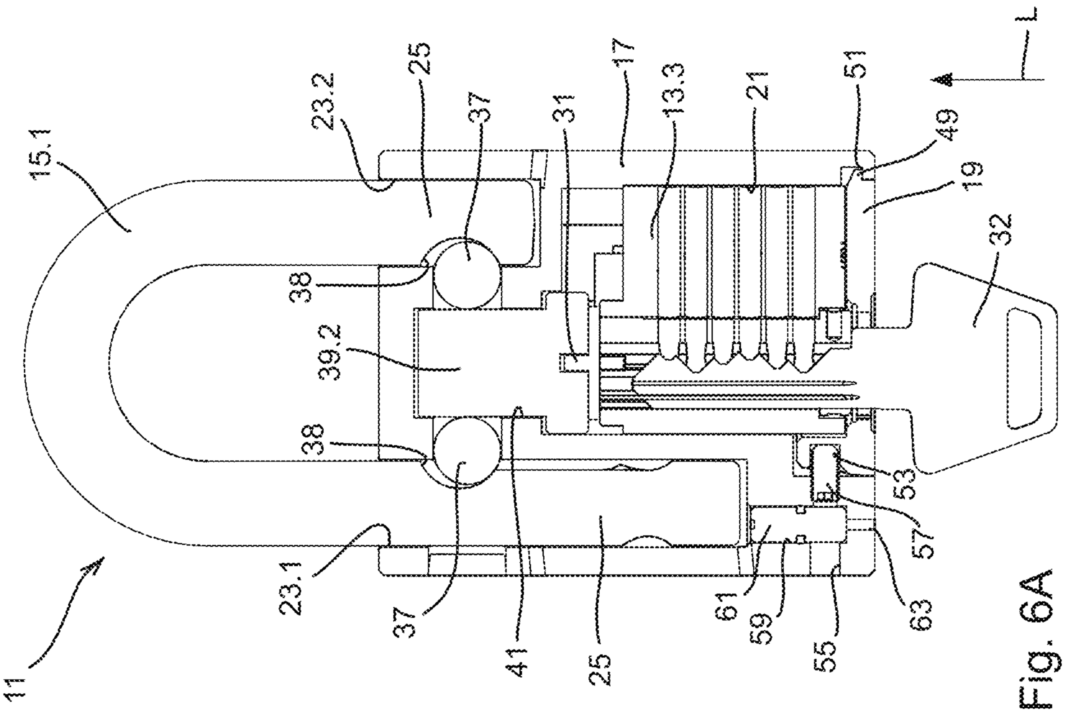
FIG. 6A shows in a sectional representation the padlock assembled in the fifth configuration shown in FIG. 5.

In the first and second configurations, which are shown in FIGS. 1 and 2A or 2B, a respective lock cylinder 13.1 of a first type is used in the padlock 11; in the third and fourth configurations, which are shown in FIGS. 3 and 4A or 4B, a lock cylinder 13.2 of a second type is used in the padlock 11; in the fifth and sixth configurations, which are shown in FIGS. 5 and 6A and 6B, a lock cylinder 13.3 of a third type is used in the padlock 11; and in the seventh and eighth configurations, which are shown in FIGS. 7 and 8A or 8B, a respective lock cylinder 13.4 of a fourth type is used in the padlock 11. Moreover, in the first, third, fifth and seventh configurations, which are shown in FIGS. 1 and 2A, 3 and 4A, 5 and 6A or 7 and 8A, a closing hoop 15.1 of a first type is used in the padlock 11 in each case, whereas in the second, fourth, sixth and eighth configurations, which are shown in FIG. 2B, 4B, 6B or 8B, a closing hoop 15.2 of a second type is used in the padlock 11 in each case.

The numbering of the configurations, just like the numbering of the lock cylinder types and closing hoop types, merely serves to distinguish terms and is not intended to imply any order or other relationship between the numbered elements.

In all eight of the configurations shown in the Figures, the padlock 11 in each case has the same lock body 17 and the same closing plate 19. The lock body 17 is produced from solid metal and has a lock cylinder receiver 21 that extends along a longitudinal direction L of the lock body 17 or of the padlock 11 and that serves to accommodate a lock cylinder 13 that may be selected from a plurality of lock cylinders of different types. In addition, the lock body 17 has a first closing hoop receiver 23.1 and a second closing hoop receiver 23.2 that extend into the lock body 17 in parallel with the longitudinal direction L and that each serve to receive a limb 25 of the respective closing hoop 15 used in the padlock 11 in order thereby to displaceably support the closing hoop 15 at the lock body 17 in parallel with the longitudinal direction L. The lock cylinder receiver 21 and the closing hoop receivers 23 as well as overall the inner structure of the lock body 17 may in particular be recognized in the sectioned three-dimensional representation of the lock body 17 in FIGS. 1, 3, 5, and 7.

The lock cylinder receiver 21, on the one hand, and the closing hoop receivers 23, on the other hand, in this respect extend into the lock body 17 from opposite sides. The two closing hoop receivers 23 are arranged transversely to the longitudinal direction L in mutually opposite marginal regions of the lock body 17. In this respect, the first closing hoop receiver 23.1 has a greater depth than the second closing hoop receiver 23.2 since the first closing hoop receiver 23.1 extends deeper into the lock body 17 from the same outer side of the lock body 17 facing in the longitudinal direction than the second closing hoop receiver 23.2. The lock cylinder receiver 21 is partly arranged in a central region of the lock body 17 located between the two marginal regions and also partly extends into that one of said two marginal regions in which the second closing hoop receiver 23.2 is arranged, which is possible because the lock cylinder receiver 21 indeed overlaps the first closing hoop receiver 23.1, but not the second closing hoop receiver 23.2, with respect to the longitudinal direction L.

When the padlock 11 is assembled, a respective one of the lock cylinders 13 included by the padlock basic kit is received in the lock cylinder receiver 21. In this respect, the lock cylinders will be designated as a lock cylinder 13.1 of a first type, a lock cylinder 13.2 of a second type, a lock cylinder 13.3 of a third type, and a lock cylinder 13.4 of a fourth type in the following, wherein this designation merely serves to make a linguistic distinction and is not to be understood as limited to a specific order, ranking, or association with the types of lock cylinders mentioned further above. The numbering of the lock cylinder types shown in the Figures is in particular essentially arbitrary and could read differently. In other words, the lock cylinder 13.2 shown in FIGS. 3, 4A and 4B could, for example, also be considered as a lock cylinder of a first type and/or the lock cylinder 13.4 shown in FIGS. 7, 8A, and 8B could be considered as a lock cylinder of a second type, etc. Only the designation of the lock cylinder 13.3 of the third type may at least appear to be defined in that a lock cylinder of this type is insertable into the lock cylinder receiver 21 of the lock body 17 without a lock cylinder adapter 33. However, even a further lock cylinder of a different type, which would then be a fifth type if numbered consecutively and which would likewise be insertable into the lock cylinder receiver 21 of the lock body 17 without a lock cylinder adapter 33, could generally also be shown in the Figures, wherein it would then, for example, be conceivable to consider this further lock cylinder as a lock cylinder of the third type and instead to consider the lock cylinder 13.3 of the third type as a lock cylinder of a fifth type.

In the first and second configurations (FIGS. 1, 2A, and 2B), the lock cylinder is in each case a lock cylinder 13.1 of a first type that is configured as a so-called profile cylinder. Accordingly, the lock cylinder 13.1 of the first type has a profile that comprises a circular cylinder section 27 and a web section 29.1 that projects radially from the cylinder section 27 with respect to the center of the cylinder section 27, that is rounded at its free end, whose width is smaller than the diameter of the cylinder section 27, and whose length substantially corresponds to the diameter of the cylinder section 27. The cylinder core of the lock cylinder 13.1 is received in the region of the lock cylinder 13.1 of the first type corresponding to the cylinder section 27 of the profile, while the region corresponding to the web section 29.1 serves to at least partly receive the tumblers of the lock cylinder 13.1.

The third and fourth configurations (FIGS. 3, 4A, and 4B) are each a lock cylinder 13.2 of a second type. In the embodiment shown, lock cylinders of the second type 13.2 have a profile that comprises a circular cylinder section 27 and a tumbler section 29.2 having a circular contour offset with respect to the cylinder section 27 such that the cylinder section 27 and the tumbler section 29.2 together form the shape of two circular surfaces that are offset from one another and that partly overlap one another. Similarly to the lock cylinder 13.1 of the first type, the cylinder core is received in the region of the lock cylinder 13.2 of the second type corresponding to the cylinder section 27, while the region corresponding to the web section 29.2 serves to at least partly receive the tumblers.

The fifth and sixth configurations (FIGS. 5, 6A, and 6B) are each a lock cylinder 13.3 of a third type that is configured as a so-called oval cylinder. Accordingly, the lock cylinder 13.3 of the third type has a profile whose shape corresponds to the convex envelope of two circular surfaces that are offset from one another and that at least substantially have the same diameter. In this respect, the one of the two circular surfaces may, in correspondence with the lock cylinders 13.1, 13.2 of the first and second types, be considered as a cylinder section 27 in which the cylinder core of the lock cylinder 13.3 of the third type is received, while the remaining region serves to at least partly receive the tumblers.

The seventh and eighth configurations (FIGS. 7, 8A, and 8B) are each a lock cylinder 13.4 of a fourth type that is similar to the lock cylinder 13.2 of the second type in that this lock cylinder 13.4 also comprises a circular cylinder section 27 and a tumbler section 29.3 having a circular contour offset from the cylinder section 27. Apart from different dimensions, in particular along the longitudinal direction L, the lock cylinders 13.2, 13.4 of the second and fourth types in particular differ in that the tumbler section 29.3 has an expanded peripheral portion 30 at the key side.

An entrainer section 31, which serves to output a rotation of the cylinder core that is possible by means of a key 32 associated with the respective lock cylinder 13 to a latch mechanism in order thereby to release or lock the respective closing hoop, is formed in the lock cylinder 13.1 of the first type as a so-called closing nose that projects radially from the cylinder core and from the remaining lock cylinder 13.1 with respect to an axis of rotation of the cylinder core in parallel with the longitudinal direction L. In contrast, the lock cylinder 13.2 of the second type, the lock cylinder 13.3 of the third type, and the lock cylinder 13.4 of the fourth type each have, as the entrainer section 31, a structure that, with respect to the axis of rotation of the cylinder core, does not project radially from the cylinder core, but projects axially from it at an end face of the respective cylinder core and in this respect has the shape of an elongate web.

The lock cylinders 13.1, 13.2, 13.4 of the first type, of the second type, and of the fourth type may not be inserted directly into the lock cylinder receiver 21 since their profile is smaller than the cross-section of the lock cylinder receiver 21 designated as the reception cross-section such that they would not be stably supported in the lock cylinder receiver 21. Therefore, the padlock basic kit or the padlock system comprises three lock cylinder adapters 33 that each have a continuous reception passage 35, which extends along an insertion direction into the respective lock cylinder adapter 33, and that are configured to substantially fill, in particular transversely to the longitudinal direction L, the intermediate space between a lock cylinder 13.1, 13.2, 13.4 of the first type, of the second type, and of the fourth type and the lock cylinder receiver 21 of the lock body 17 (the lock cylinder adapters 33 are each shown hatched in the sectional representations of FIGS. 2A, 2B, 4A, 4B, 8A, and 8B).

In this respect, the reception passage 35 of the first lock cylinder adapter 33.1 has a constant reception cross-section that is complementary to the profile of the lock cylinder 13.1, of the first type; the reception passage 35 of the second lock cylinder adapter 33.2 has a constant reception cross-section that is complementary to the profile of the lock cylinder 13.2 of the second type; and the reception passage 35 of the third lock cylinder adapter 33.3 has a constant reception cross-section that is complementary to the profile of the lock cylinder 13.4 of the fourth type. Thus, the lock cylinders 13.1, 13.2, 13.4 of the first type, of the second type, and of the fourth type may each be inserted flush into the reception passage 35 of the corresponding lock cylinder adapter 33.1, 33.2, 33.3. The reception passage 35 of the third lock cylinder adapter 33.3 is in this respect expanded at the key side in the region of the tumbler section 29.3 such that it has an undercut 36. In this way, the lock cylinder 13.4 of the fourth type may be received at least substantially flush into the reception passage 35 despite said expanded peripheral portion 30.

Since the lock cylinder adapters 33 in turn each have a profile, i.e. an outer cross-section, that corresponds to the reception cross-section of the lock cylinder receiver 21 of the lock body 17, the first lock cylinder adapter 33.1 with the lock cylinder 13.1 of the first type inserted therein, the second lock cylinder adapter 33.2 with the lock cylinder 13.2 of the second type inserted therein, or the third lock cylinder adapter 33.3 with the lock cylinder 13.4 of the fourth type inserted therein may subsequently be inserted flush into the lock cylinder receiver 21 (cf. in particular the sectional representations of FIGS. 2A, 2B, 4A, 4B, 8A, and 8B).

For lock cylinders 13.3 of the third type, no lock cylinder adapter 33 is, in contrast, necessary since the lock cylinder receiver 21 has a constant reception cross-section that is complementary to the profile of a lock cylinder 13.3 of the third type such that the lock cylinder 13.3 of the third type may be inserted directly in a flush manner into the lock cylinder receiver 21 (cf. in particular the sectional representations of FIGS. 6A and 6B).

Said latch mechanism for locking the limbs 25 of a respective closing hoop 15 in the closing hoop receivers 23 comprises two latch elements 37 that are formed as locking balls and that are part of the padlock basic kit or of the padlock system. The latch elements 27 are displaceably supported in the lock body 17 transversely to the longitudinal direction L and may in this respect in a locked position, which is shown in FIGS. 2A, 2B, 4A, 4B, 6A, 6B, 8A, and 8B, engage into a respective one of the closing hoop receivers 23 (the one latch element 37 into one closing hoop receiver 23 and the other latch element into the other closing hoop receiver) in order in each case to engage there into a recess 38 of the respective limb 25 of the closing hoop 15 and thereby to lock the closing hoop 15 against departing from its closed position shown in the Figures.

So that a rotation output by the entrainer section 31 of the respective lock cylinder 13 may be used to urge the latch elements 37 into their locked position and subsequently to block them therein or to release them for departing from the locked position for unlocking the closing hoop 15, the latch mechanism furthermore comprises a rotating latch 39 that is rotatably received about an axis of rotation D into a rotating latch receiver 41 of the lock body 17 that adjoins the lock cylinder receiver 21 in the longitudinal direction L, but that has a smaller cross-section and is in particular only arranged in said central region of the lock body 17. The rotating latch 39 is in this respect arranged such that its axis of rotation D is coaxial with the axis of rotation of the cylinder core of the respective lock cylinder 13.

So that the latch mechanism may be driven by the different entrainer sections 31 of the lock cylinders 13 of different types, the padlock basic kit or the padlock system comprises a first rotating latch 39.1, a second rotating latch 39.2, and a third rotating latch 39.3.

The first rotating latch 39.1 is configured to be rotationally effectively coupled to the entrainer section 31 of the lock cylinder 13.1 of the first type and, for this purpose, to partly engage around an end section of the lock cylinder 13.1 in the direction of revolution about the axis of rotation of the cylinder core of said lock cylinder 13.1. The rotating latch 39.1 is in particular configured to be plugged onto the end section of the lock cylinder 13.1 in a direction that is a radial direction with respect to the axis of rotation of the cylinder core of the lock cylinder 13.1 of the first type (cf. FIG. 1).

The second rotating latch 39.2 and the third rotating latch 39.3 are, in contrast, configured to be rotationally effectively coupled to the mutually similar entrainer sections 31 of the lock cylinders 13.2, 13.3, 13.4 of the second type, of the third type, and of the fourth type and for this purpose have, at an end face, a groove which is complementary to the web-shaped entrainer section 31 of the respective lock cylinder 13 and into which the entrainer section 31 may axially engage (cf. FIGS. 4A, 4B, 6A, 6B, 8A, and 8B). The second rotating latch 39.2 and the third rotating latch 39.3 in particular differ from one another with respect to their length and in that the second rotating latch 39.2 has an expanded peripheral portion in the region of said end face, while the third rotating latch 39.3 has an at least substantially circular cross-section having a constant diameter.

All three rotating latches 39 each have a cam section 43 that has an at least substantially cylindrical shape at whose outer periphery two recesses 45 diametrically opposed with respect to the axis of rotation D are formed, whereby a control contour for the latch elements 37 is formed that, depending on the rotational position of the rotating latch 39, forces the latch elements 37 into a locked position in which they lock the closing hoop 15 against departing from the closed position or release it for a radial movement.

In the first rotating latch 39.1, said recesses 45 each have the shape of a spherical shell. In the second rotating latch 39.2 and the third rotating latch 39.3, in contrast, the recesses 45 each have the shape of a cylinder jacket segment. This has the advantage that the second rotating latch 39.2 (just like the third rotating latch 39.3) is not fixed to a precisely axial position with respect to the longitudinal direction L relative to the latch elements 37, which are formed as locking balls, and may therefore be used both with the lock cylinder 13.2 of the second type and with the lock cylinder 13.3 of the third type that is somewhat longer in comparison thereto. So that the second rotating latch 39.2, when used with the shorter lock cylinder 13.2 of the second type, does not have too much clearance axially and does not come out of engagement with the entrainer section 31 of the lock cylinder 13.2, the padlock basic kit or the padlock system also comprises a spacer element 47 that has the shape of a circular disk whose diameter corresponds to the diameter of the cam section 43 (cf. FIGS. 3, 4A, and 4B). In this way, the second rotating latch 39.2 may so-to-say be lengthened by means of the spacer element 47 and the shorter length of the lock cylinder 13.2 of the second type may thereby be compensated in comparison with the lock cylinder 13.3 of the third type.

So that the lock cylinders 13 may indeed be easily inserted into the lock cylinder receiver 21, but are subsequently reliably secured therein and are largely protected from access, the lock cylinder receiver 21 is closed by said closing plate 19. For this purpose, the closing plate 19 has a projection 49 with which it engages into an undercut 51 that is outwardly formed in a side wall of the lock cylinder receiver 21 in the region of the opening of the lock cylinder receiver 21. The undercut 51 is in this respect arranged in that marginal region of the lock body 17 in which the second closing hoop receiver 23.2 is also located.

The projection 49 is chamfered such that the closing plate 19 may be inserted obliquely into the undercut 51 with respect to the longitudinal direction L and may then be pivoted around the region of the engagement into the undercut 51 such that it closes the lock cylinder receiver 21 perpendicular to the longitudinal direction L and in this respect ends substantially flush with the outer side of the lock body 17.

At the side opposite the projection 49, the closing plate 19 has a threaded bore 53 that, when the closing plate 19 closes the lock cylinder receiver 21, is aligned with a screw channel 55 formed in the lock body 17. In that marginal region of the lock body 17 in which the first closing hoop receiver 23.1 is also located, the screw channel 55 extends transversely to the longitudinal direction L from the outside into the lock body 17 and leads into the lock cylinder receiver 21. A screw 57 in the form of a threaded pin may thereby be screwed through the screw channel 55 into the threaded bore 53 of the closing plate and may in this respect also partly engage into the screw channel 55 such that it thereby locks the closing plate 19. An opening of the lock cylinder receiver 21 closed by the closing plate 19 is then only possible again when the screw 57 has been screwed out of the threaded bore 53 again.

To ensure that the screw 57 may at least not be unscrewed when the padlock 11 is closed, the lock body 17 has a blocking passage 59 which extends in parallel with the longitudinal direction L from the first closing hoop receiver 23.1 up to and into the screw channel 55 and into which a blocking element 61 in the form of a bolt may be inserted. When the blocking element 61 is inserted into the blocking passage 59, at least a part of the locking element 61 thus also engages into the screw channel 55 and thereby blocks access to the screw 57 from the outside.

To be able to unscrew the screw 57, the blocking element 61 therefore first has to be removed from the blocking passage 59. However, since the blocking element 61 has substantially the same length as the blocking passage 59, the blocking element 61 may not be moved out of the blocking passage 59 as long as a limb 25 of the respective closing hoop 15 is received in the first closing hoop receiver 23.1 and in this respect extends up to the base of the closing hoop receiver 23.1 into which the blocking passage 59 leads. In this way, an unlocking of the closing plate 19 is linked to the condition that the padlock 11 is unlocked and the limb 25 of the respective closing hoop 15 may consequently be removed from the first closing hoop receiver 23.1.

To be able to easily displace the blocking element 61, when the first closing hoop receiver 23.1 is free, at least so far that it no longer blocks access to the screw 57, a passage 63 is provided between the blocking passage 59 and the outer side of the lock body 17 from which the lock cylinder receiver 21 extends into the lock body 17. This passage 63 has a smaller diameter than the blocking passage 59 such that the blocking element 61 may not pass through it. However, the blocking element 61 may be acted on from the outside through the passage 63 by means of a correspondingly narrow tool and may thereby be pushed at least up to and out of the screw channel 55 in the direction of the first closing hoop receiver 23.1 such that the access to the screw 57 is then free.

When the closing plate 19 closes the lock cylinder receiver 21, it covers the respective lock cylinder 13 received therein substantially completely, i.e. in particular as far as possible, without preventing an actuation of the lock cylinder 13 by means of the associated key 32 in this respect-. Therefore, the closing plate 19 has a key opening 65 through which the respective key 32 may be introduced into the respective lock cylinder 13 inserted into the lock cylinder receiver 21, wherein the key opening 65 is only as large as is absolutely necessary for the introduction of the key 32 and for a turning of the key 32 introduced to lock or unlock the padlock 11. For this purpose, the key opening 65 has the shape of two circular sectors that are arranged opposite one another, that overlap one another with their tips, and whose central angles each amount to approximately 65°, which corresponds to the largest one of the angles of rotation required for a key actuation of the lock cylinders 13 of the first, second, and third types.

The padlock 11 may be assembled both in configurations in which it has a closing hoop 15.1 of the first type and in configurations in which it has a closing hoop 15.2 of the second type, wherein the lengths of the two limbs 25 of the respective closing hoop 15 are different in the closing hoop 15.1 of the first type and are identical in the closing hoop 15.2 of the second type (cf. FIGS. 2A, 4A, 6A and 8A, on the one hand, and FIGS. 2B, 4B, 6B and 8B, on the other hand). The two closing hoop receivers 23 extend so far into the lock body 17 that the depth of the first closing hoop receiver 23.1 and the depth of the second closing hoop receiver 23.2 differ by an amount that corresponds to the difference of the lengths of the two limbs 25 of the closing hoop 15.1 of the first type. In this way, when the padlock 11 is closed, both limbs 25 of the closing hoop 15.1 of the first type may each extend up to the base of the respective closing hoop receiver 23 (cf. FIGS. 2A, 4A, 6A, and 8A).

However, due to limbs 25 of the closing hoop 15.2 of the second type that are of equal length, this is not possible in the configurations with this closing hoop type. If a padlock 11 is locked in a configuration in which it has a closing hoop 15.2 of the second type, a spacing therefore remains between the limb 25 of the closing hoop 15.2 received in the first closing hoop receiver 23.1 and the base of the first closing hoop receiver 23.1. If this spacing simply remains free in this respect, the blocking element 61 received in the blocking passage 59 is not secured against being displaced from the screw channel 55 when the padlock 11 is closed such that it would always be possible in a simple manner to gain access to the screw 57.

To prevent this, the padlock basic kit or the padlock system comprises a reducing element 67 in the form of a bolt whose diameter is equal to the diameter of the two closing hoop receivers 23 and which may therefore be inserted into the first closing hoop receiver 23.1 to reduce its depth. The length of the reducing element 67 in this respect corresponds to the difference of the depths of the two closing hoop receivers 23 such that it reduces the depth of the first closing hoop receiver 23.1 to the depth of the second closing hoop receiver 23.2 (cf. FIGS. 2B, 4B, 6B, and 8B).

Thus, when the reducing element 67 is inserted, a spacing, but not a clearance, remains between the limb 25 of the closing hoop 15.2 of the second type received in the first closing hoop receiver 23.1 and the base of the first closing hoop receiver 23.1 such that, even in such a configuration of the padlock 11, the respective lock cylinder 13 is reliably secured in the lock body 17 via the locking of the closing plate 19 by means of the screw 57 and the blocking element 61.

REFERENCE NUMERALS

11 padlock
13.1 lock cylinder of a first type
13.2 lock cylinder of a second type

13.3 lock cylinder of a third type
13.4 lock cylinder of a fourth type
15.1 closing hoop of a first type
15.2 closing hoop of a second type
17 lock body
19 closing plate
21 lock cylinder receiver
23.1 first closing hoop receiver
23.2 second closing hoop receiver
25 limb
27 cylinder section
29.1 web section
29.2 tumbler section
29.3 tumbler section
30 expanded peripheral portion
31 entrainer section
32 key
33.1 first lock cylinder adapter
33.2 second lock cylinder adapter
33.3 third lock cylinder adapter
35 reception passage
36 undercut
37 latch element
38 recess
39.1 first rotating latch
39.2 second rotating latch
39.3 third rotating latch
41 rotating latch receiver
43 cam section
45 recess
47 spacer element
49 projection
51 undercut
53 threaded bore
55 screw channel
57 screw
59 blocking passage
61 blocking element
63 passage
65 key opening
67 reducing element
D axis of rotation
L longitudinal direction

What is claimed is:

1. A padlock basic kit for assembling a padlock in a configuration that can be selected from a plurality of configurations, wherein the configurations differ with respect to the type of lock cylinder used in the padlock, wherein the basic kit comprises a lock body, at least two different lock cylinder adapters, and a closing plate, wherein a first one of the at least two lock cylinder adapters has a reception passage that is configured to receive a lock cylinder of a first type, wherein a second one of the at least two lock cylinder adapters has a reception passage that is configured to receive a lock cylinder of a second type, wherein the lock body has a lock cylinder receiver that extends along a longitudinal direction into the lock body and that is configured to selectively receive the first lock cylinder adapter with a lock cylinder of the first type inserted therein or the second lock cylinder adapter with a lock cylinder of the second type inserted therein, and wherein the closing plate is configured to close the lock cylinder receiver such that the closing plate substantially completely covers a respective lock cylinder received in the lock cylinder receiver, wherein the lock cylinder receiver of the lock body is configured to selectively receive the first lock cylinder adapter with a lock cylinder of the first type inserted therein, the second lock cylinder adapter with a lock cylinder of the second type inserted therein, or a lock cylinder of a third type, and wherein a reception cross-section of the lock cylinder receiver of the lock body is complementary to a profile of the lock cylinder of the third type.

2. A padlock basic kit in accordance with claim 1, wherein the reception passage of the first lock cylinder adapter extends along an insertion direction into the first lock cylinder adapter and at least regionally has a constant reception cross-section that is complementary to the profile of a lock cylinder of the first type, wherein the reception passage of the second lock cylinder adapter extends along an insertion direction into the second lock cylinder adapter and at least regionally has a constant reception cross-section that is complementary to the profile of a lock cylinder of the second type, wherein the lock cylinder receiver of the lock body at least regionally has a constant reception cross-section with respect to the longitudinal direction, and wherein the at least two lock cylinder adapters each have a profile that is complementary to the reception cross-section of the lock cylinder receiver of the lock body.

3. A padlock basic kit in accordance with claim 1, wherein lock cylinders of the first type have a profile that comprises a circular cylinder section and a web section that projects radially from the cylinder section with respect to the center of the cylinder section, whose width is smaller than the diameter of the cylinder section, and whose length at least substantially corresponds to the diameter of the cylinder section.

4. A padlock basic kit in accordance with claim 1, wherein lock cylinders of the second type have a profile that comprises a circular cylinder section and a tumbler section having a circular contour offset with respect to the cylinder section such that the cylinder section and the tumbler section together form the shape of two circular surfaces that are offset from one another and that partly overlap one another.

5. A padlock basic kit in accordance with claim 1, wherein lock cylinders of a third type have a profile whose shape corresponds to the convex envelope of two mutually offset circular surfaces that at least substantially have the same diameter.

6. A padlock basic kit in accordance with claim 1, wherein the basic kit further comprises at least two different rotating latches that are each configured to be rotatably supported in the lock body about an axis of rotation in parallel with the longitudinal direction in order, depending on the rotational position, to lock a closing hoop displaceably supported at the lock body against departing from a closed position, wherein a first one of the at least two rotating latches is configured to be rotationally effectively coupled to an entrainer section of a lock cylinder of at least one of said types, and a second one of the at least two rotating latches is configured to be rotationally effectively coupled to an entrainer section of a lock cylinder of at least one other of said types.

7. A padlock basic kit in accordance with claim 6, wherein the first rotating latch is configured to be rotationally effectively coupled to an entrainer section of a lock cylinder of at least one of said types that is formed by a structure projecting radially from a cylinder core of the respective lock cylinder with respect to an axis of rotation of the cylinder core, wherein the second rotating latch is configured to be rotationally effectively coupled to an entrainer section of a lock cylinder of at least one other of said types that is formed by a structure projecting axially from a cylinder core of the respective lock cylinder with respect to an axis of rotation of the cylinder core.

8. A padlock basic kit in accordance with claim 6, wherein the basic kit further comprises two latch elements, that are arranged diametrically with respect to the axis of rotation and that are supported in a radially movable manner, wherein the rotating latches each have a cam section that at least substantially has a cylindrical shape at whose outer periphery two recesses are formed that are diametrically opposed with respect to the axis of rotation, whereby a control contour for the latch elements is formed that, depending on the rotational position of the rotating latch, forces the latch elements into a locked position in which they lock the closing hoop against departing from the closed position or release said closing hoop for a radial movement.

9. A padlock basic kit in accordance with claim 1, wherein the closing plate has a key opening for the introduction of a key through the key opening into the respective lock cylinder inserted into the lock cylinder receiver of the lock body, wherein the key opening at least substantially has the shape of two circular sectors that are arranged opposite one another and that have an identical central angle.

10. A padlock basic kit in accordance with claim 1, wherein the lock body has a screw channel for a screw by means of which the closing plate can be locked when the closing plate closes the lock cylinder receiver, wherein the screw channel extends transversely to the longitudinal direction into the lock body, and wherein the lock body further comprises a blocking passage for a blocking element that leads into the screw channel in parallel with the longitudinal direction in order to block access from the outside through the screw channel to the screw by means of the blocking element inserted into the blocking passage and engaging into the screw channel.

11. A padlock basic kit in accordance with claim 10, wherein the lock body is configured such that the blocking element can only be removed from the blocking passage via a closing hoop receiver formed in the lock body for receiving a limb of a closing hoop used in the padlock.

12. A padlock basic kit in accordance with claim 1, A padlock basic kit for assembling a padlock in a configuration that can be selected from a plurality of configurations, wherein the configurations differ with respect to the type of lock cylinder used in the padlock, wherein the basic kit comprises a lock body, at least two different lock cylinder adapters, and a closing plate, wherein a first one of the at least two lock cylinder adapters has a reception passage that is configured to receive a lock cylinder of a first type, wherein a second one of the at least two lock cylinder adapters has a reception passage that is configured to receive a lock cylinder of a second type, wherein the lock body has a lock cylinder receiver that extends along a longitudinal direction into the lock body and that is configured to selectively receive the first lock cylinder adapter with a lock cylinder of the first type inserted therein or the second lock cylinder adapter with a lock cylinder of the second type inserted therein, and wherein the closing plate is configured to close the lock cylinder receiver such that the closing plate substantially completely covers a respective lock cylinder received in the lock cylinder receiver, wherein the lock body has a first closing hoop receiver and a second closing hoop receiver that extend in parallel with the longitudinal direction into the lock body and that are configured to receive a respective one of two limbs of a closing hoop, and wherein the basic kit further comprises a reducing element that is configured to be inserted into the first closing hoop receiver in order to reduce a depth of the first closing hoop receiver.

13. A padlock basic kit in accordance with claim 12, wherein the depth of the first closing hoop receiver differs from a depth of the second closing hoop receiver by an amount that corresponds to the difference of the lengths of the two limbs of a closing hoop of a first type, and wherein the reducing element is configured to reduce the depth of the first closing hoop receiver such that the reduced depth of the first closing hoop receiver differs from the depth of the second closing hoop receiver by an amount that corresponds to the difference of the lengths of the two limbs of a closing hoop of a second type.

14. A padlock basic kit in accordance with claim 12, wherein the depth of the first closing hoop receiver is greater than the depth of the second closing hoop receiver, and wherein the reducing element is configured to reduce the depth of the first closing hoop receiver to the depth of the second closing hoop receiver.

15. A padlock system for a variable formation of padlocks in different configurations that differ with respect to the type of lock cylinder used in the respective padlock, wherein the padlock system comprises at least one padlock basic kit comprising:

a lock body, at least two different lock cylinder adapters, and a closing plate, wherein a first one of the at least two lock cylinder adapters has a reception passage that is configured to receive a lock cylinder of a first type, wherein a second one of the at least two lock cylinder adapters has a reception passage that is configured to receive a lock cylinder of a second type, wherein the lock body has a lock cylinder receiver that extends along a longitudinal direction into the lock body and that is configured to selectively receive the first lock cylinder adapter with a lock cylinder of the first type inserted therein or the second lock cylinder adapter with a lock cylinder of the second type inserted therein, and wherein the closing plate is configured to close the lock cylinder receiver such that the closing plate substantially completely covers a respective lock cylinder received in the lock cylinder receiver, wherein the padlock system further includes at least one lock cylinder of the first type and at least one lock cylinder of the second type, wherein the lock cylinder receiver of the lock body is configured to selectively receive the first lock cylinder adapter with the lock cylinder of the first type inserted therein, the second lock cylinder adapter with the lock cylinder of the second type inserted therein, or a lock cylinder of a third type, and wherein the padlock system further comprises at least one lock cylinder of the third type.

16. A padlock system for a variable formation of padlocks in different configurations that differ with respect to the type of lock cylinder used in the respective padlock, wherein the padlock system comprises at least one padlock basic kit comprising:

a lock body, at least two different lock cylinder adapters, and a closing plate, wherein a first one of the at least two lock cylinder adapters has a reception passage that is configured to receive a lock cylinder of a first type, wherein a second one of the at least two lock cylinder adapters has a reception passage that is configured to receive a lock cylinder of a second type, wherein the lock body has a lock cylinder receiver that extends along a longitudinal direction into the lock body and that is configured to selectively receive the first lock cylinder adapter with a lock cylinder of the first type inserted therein or the second lock cylinder adapter with a lock cylinder of the second type inserted therein, and wherein the closing plate is configured to close the lock cylinder receiver such that it substantially completely covers a respective lock cylinder received in the lock cylinder receiver, wherein the padlock system comprises at least one closing hoop of a first type and at least one closing hoop of a second type.

17. A padlock basic kit in accordance with claim 3, wherein the web section is rounded at a free end of the web section.

18. A padlock basic kit in accordance with claim 8, wherein the latch elements are locking balls.

* * * * *